US007841432B2

(12) United States Patent
Lynn et al.

(10) Patent No.: US 7,841,432 B2
(45) Date of Patent: Nov. 30, 2010

(54) HYDRO-ELECTRIC HYBRID DRIVE SYSTEM FOR MOTOR VEHICLE

(75) Inventors: Alfred Edmund Lynn, Troy, MI (US); Kenric Rose, Howell, MI (US); Simon John Baseley, Ann Arbor, MI (US); James A Duggan, Temperance, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 557 days.

(21) Appl. No.: 11/719,054

(22) PCT Filed: Nov. 22, 2005

(86) PCT No.: PCT/US2005/042671

§ 371 (c)(1),
(2), (4) Date: Jan. 11, 2008

(87) PCT Pub. No.: WO2006/055978

PCT Pub. Date: May 26, 2006

(65) Prior Publication Data

US 2008/0251302 A1     Oct. 16, 2008

Related U.S. Application Data

(60) Provisional application No. 60/629,562, filed on Nov. 22, 2004, provisional application No. 60/629,560, filed on Nov. 22, 2004, provisional application No. 60/629,561, filed on Nov. 22, 2004.

(51) Int. Cl.
*B60K 6/20* (2007.10)
(52) U.S. Cl. ............ 180/65.21; 180/301; 180/306
(58) Field of Classification Search ......... 180/65.1, 180/65.245, 65.265, 165, 6.48, 6.26, 6.32, 180/305, 306, 65.21, 301; 60/464, 414
See application file for complete search history.

(56) References Cited

U.S. PATENT DOCUMENTS

| 2,990,785 | A | * | 7/1961 | Nielsen | .......... 137/351 |
| 3,807,521 | A | * | 4/1974 | Sargent | .......... 180/6.48 |
| 3,990,235 | A | | 11/1976 | Bauchet | |
| 4,188,859 | A | | 2/1980 | Van Wagenen et al. | |

(Continued)

FOREIGN PATENT DOCUMENTS

DE         199 55 312  A1      6/2001

(Continued)

*Primary Examiner*—Hau V Phan
(74) *Attorney, Agent, or Firm*—Berenato & White, LLC

(57) ABSTRACT

A hybrid electro-hydraulic drive system is provided for a vehicle and comprises a hydraulic transmission including a first hydraulic machine and at least one second hydraulic machine drivingly connected to drive wheels of the motor vehicle for driving thereof, an electric motor/generator operatively connected to the first hydraulic machine, and at least one energy storage device operable to store and release a hydraulic fluid energy or an electrical energy. The second hydraulic machine is a reversible hydraulic pump/motor unit capable to function both as a hydraulic pump and a hydraulic motor. The energy storage device is operatively connected to either the hydraulic transmission or the electric motor/generator. In a retarding mode the hydraulic transmission and/or the electric motor/generator retard the vehicle, while in a driving mode they supply a supplementary power to the drive wheels to assist propulsion of the vehicle.

21 Claims, 20 Drawing Sheets

U.S. PATENT DOCUMENTS

| | | | |
|---|---|---|---|
| 4,232,568 A * | 11/1980 | Maeda | 475/81 |
| 4,301,881 A * | 11/1981 | Griffin | 180/6.48 |
| 4,413,698 A * | 11/1983 | Conrad et al. | 180/305 |
| 4,663,937 A | 5/1987 | Cullin | |
| 5,193,416 A * | 3/1993 | Kanayama | 60/490 |
| 5,205,123 A | 4/1993 | Dunstan | |
| 5,285,111 A | 2/1994 | Sherman | |
| 5,337,629 A * | 8/1994 | Kita | 60/487 |
| 5,495,912 A * | 3/1996 | Gray et al. | 180/165 |
| 5,505,527 A | 4/1996 | Gray, Jr. et al. | |
| 5,819,536 A * | 10/1998 | Mentink | 60/464 |
| 6,170,587 B1 | 1/2001 | Bullock | |
| 6,242,873 B1 | 6/2001 | Drozdz et al. | |
| 6,381,955 B1 | 5/2002 | Morganti et al. | |
| 6,394,208 B1 | 5/2002 | Hampo et al. | |
| 6,454,033 B1 | 9/2002 | Nathan et al. | |
| 6,460,332 B1 * | 10/2002 | Maruta et al. | 60/414 |
| 6,543,311 B1 | 4/2003 | Baginski et al. | |
| 6,615,940 B2 | 9/2003 | Morisawa | |
| 6,629,024 B2 | 9/2003 | Tabata et al. | |
| 6,644,004 B2 | 11/2003 | Reimers et al. | |
| 6,751,534 B2 | 6/2004 | Robichaux et al. | |
| 6,834,737 B2 | 12/2004 | Bloxham | |
| 6,837,323 B2 | 1/2005 | Denton et al. | |
| 6,951,259 B2 * | 10/2005 | Irikura | 180/6.3 |
| 7,104,349 B2 * | 9/2006 | Gray, Jr. | 180/65.245 |
| 7,119,454 B1 * | 10/2006 | Chiao | 307/9.1 |
| 7,201,095 B2 * | 4/2007 | Hughey | 60/414 |
| 7,273,122 B2 * | 9/2007 | Rose | 180/165 |
| 7,458,431 B2 * | 12/2008 | Irikura | 180/6.26 |
| 7,493,975 B2 * | 2/2009 | Irikura | 180/6.32 |
| 2001/0040057 A1 * | 11/2001 | Hasegawa et al. | 180/6.2 |
| 2002/0074175 A1 | 6/2002 | Bloxham | |
| 2002/0125053 A1 | 9/2002 | Judkins | |
| 2002/0138182 A1 | 9/2002 | Swales et al. | |
| 2003/0019675 A1 | 1/2003 | Haas et al. | |
| 2003/0146026 A1 | 8/2003 | Enjoji et al. | |
| 2004/0055266 A1 | 3/2004 | Reimers et al. | |
| 2004/0128966 A1 | 7/2004 | Kempf | |
| 2004/0245039 A1 | 12/2004 | Braun et al. | |
| 2005/0167178 A1 | 8/2005 | Johnson | |

FOREIGN PATENT DOCUMENTS

| | | |
|---|---|---|
| EP | 0 494 236 A | 7/1992 |
| WO | WO 91/05163 | 4/1991 |

\* cited by examiner

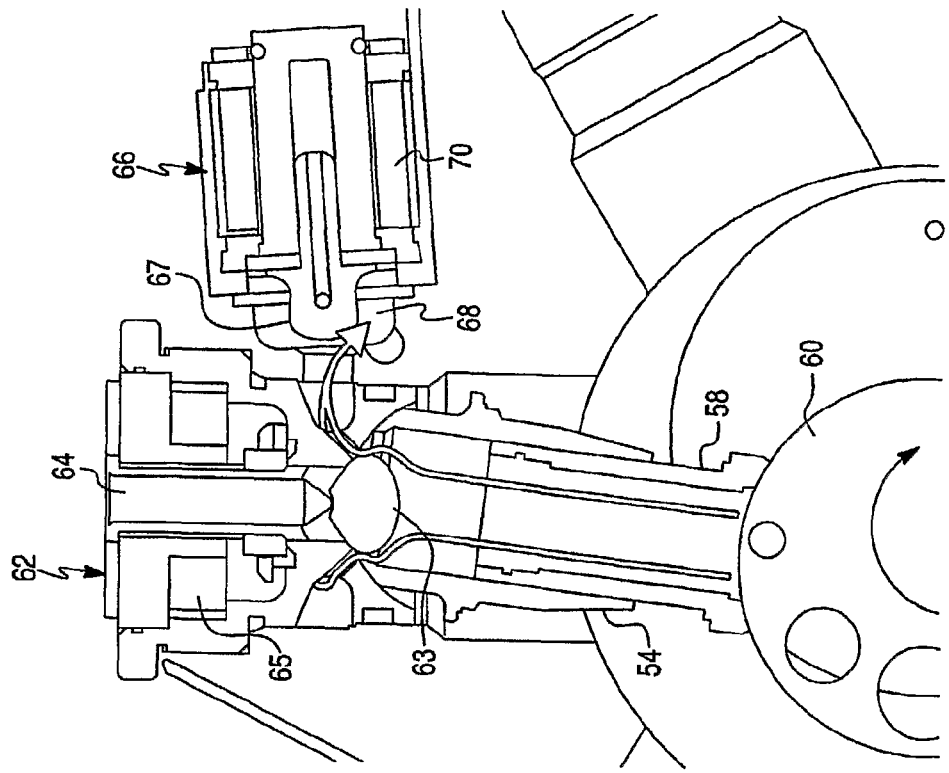
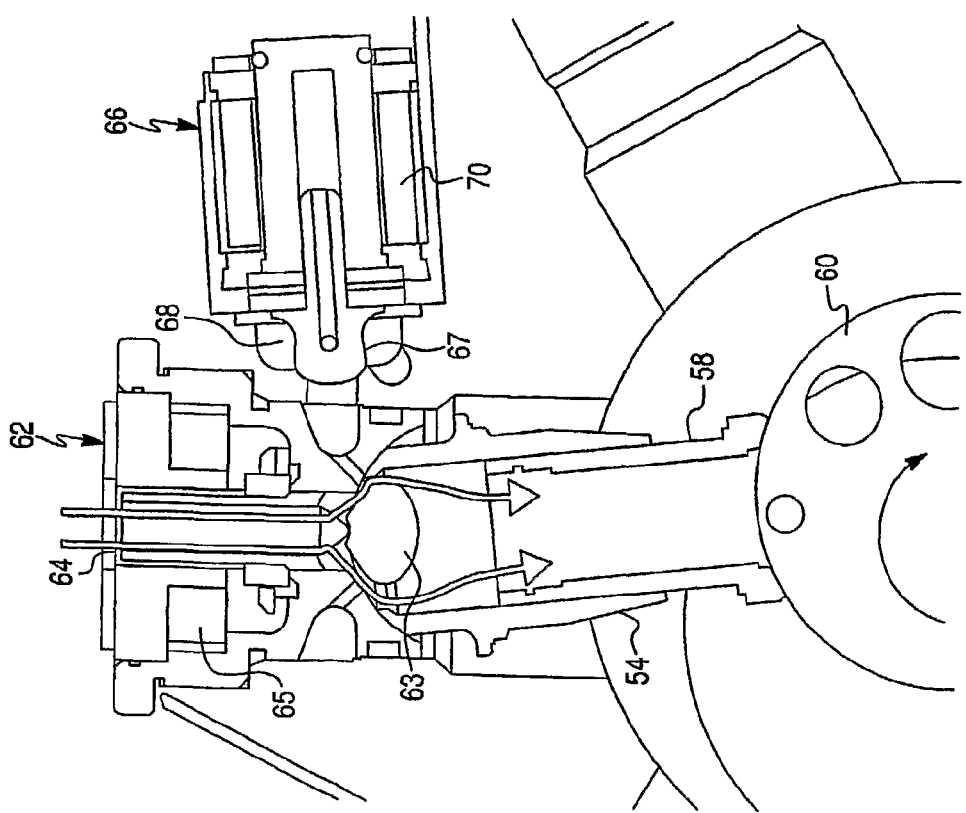

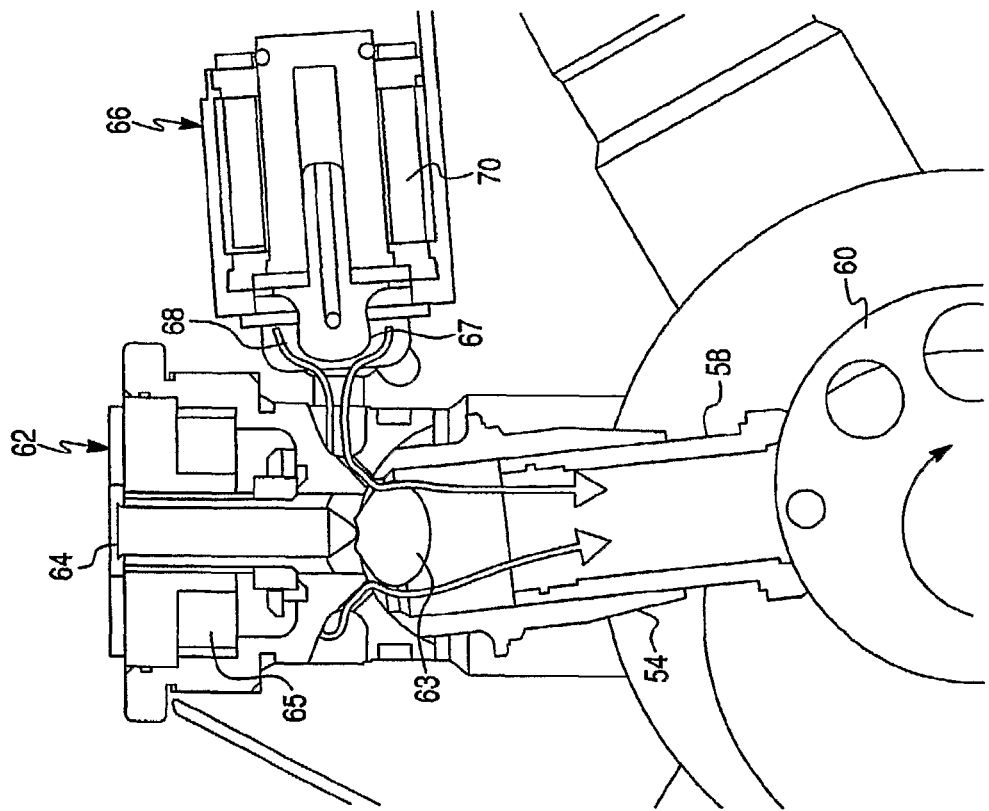
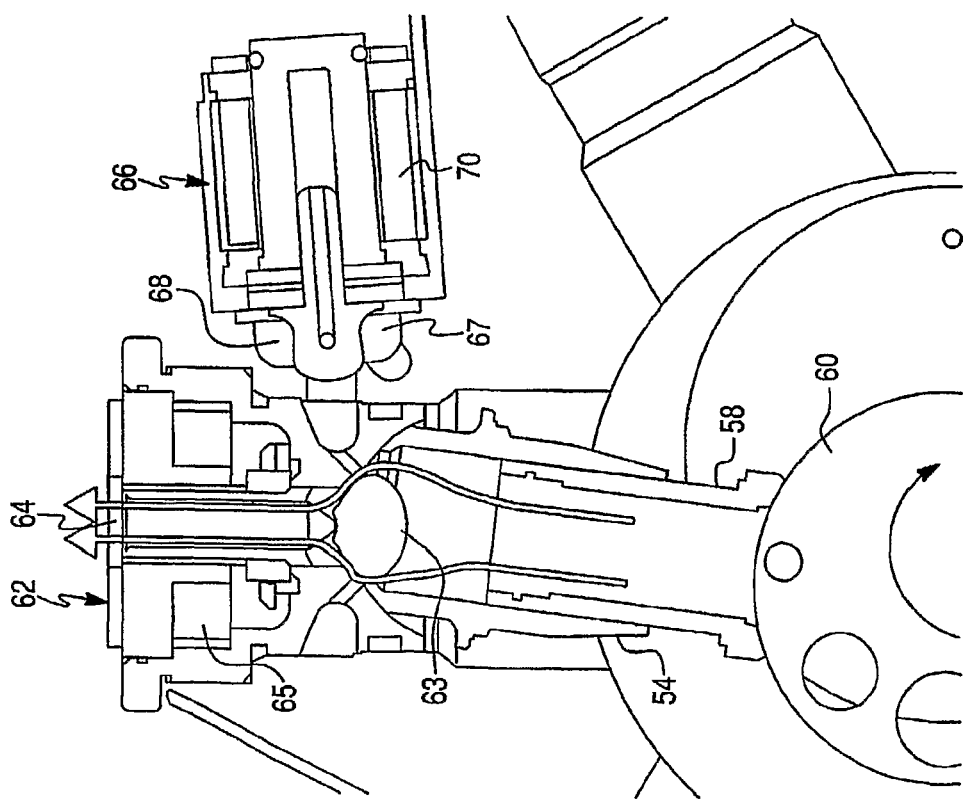

HYDRO-ELECTRIC HYBRID DRIVE SYSTEM FOR MOTOR VEHICLE

CROSS REFERENCE TO RELATED APPLICATIONS

This application relates to and claims priority under 35 U.S.C. 119(e) of U.S. Provisional Patent Application Ser. No. 60/629,560 filed on Nov. 22, 2004; U.S. Provisional Patent Application Ser. No. 60/629,561 filed on Nov. 22, 2004; and U.S. Provisional Patent Application Ser. No. 60/629,562 filed on Nov. 22, 2004, which are incorporated herein by reference.

BACKGROUND OF THE INVENTION

1. Field of the Invention

The present invention relates to hybrid drive systems in general and, more particularly, to a hybrid drive system of a motor vehicle including a combination of a hydraulic transmission and an electric drive.

2. Description of the Prior Art

Hybrid hydraulic (or regenerative) drive systems are known and have been applied to motor vehicles, especially trucks and buses. Such systems harness energy by retarding the vehicle under braking conditions and accumulating that energy for later use to propel the vehicle. More specifically, typical hybrid hydraulic drive systems utilize a hydraulic machine in the form of an integrated hydraulic pump/motor unit to absorb and add power to a conventional vehicle drive system. While the system is absorbing power the hydraulic pump/motor unit is used to pump hydraulic fluid from a low-pressure vessel or reservoir into a hydraulic energy storage system. This energy storage system typically consists of one or more nitrogen charged hydraulic accumulators. In many cases the functionality also exists to absorb power and reject it into the atmosphere as waste heat energy rather than capturing it. When the hybrid hydraulic system is adding power to a driveline of the vehicle drive system, the hydraulic pump/motor unit is acting as a motor, utilizing the hydraulic energy stored in the accumulator(s).

The current systems have however lacked flexibility in their operation, as they principally have been arranged to dump accumulated energy all at once, for example when a vehicle is accelerating from a standing start, while those systems that have allowed for more controlled release of stored energy, have not done so to optimum efficiency. The use of the energy in the known systems is therefore somewhat inefficient and the known systems therefore have not met with widespread use. Additionally, known systems are time consuming and labor intensive to install.

The motor/pump units in the current hybrid hydraulic drive systems are coupled to the driveline of the vehicle drive system downstream of a vehicular transmission. In other words, the driveline integrated pump/motor absorbs and adds hydraulic power after the vehicular transmission. Due to the reduction gear ratio of the vehicular transmission and the inherent frictional and other power losses in the transmission, the motor/pump unit of the current hybrid hydraulic drive systems should generate substantial amount of the pressurized hydraulic fluid. Single speed driveline integrated systems are limited in their maximum power contribution by the speed of the driveline. Typically when the vehicle speed is low, the driveline speeds are low, this results in low power availability to the driveline. The only way to compensate for the lower driveline speeds is to use a larger displacement pump/motor unit. The larger pump/motor unit allows for a higher torque to be applied to the driveline. For a single speed driveline integrated design, the power availability differential can only be partially mitigated through the use of a larger pump/motor. At some point, depending on the particular application, it becomes unreasonable to increase the size of the pump/motor. Another important factor is that in most cases the higher the pump/motor displacement, the lower the maximum permissible operating speed. This lower maximum operating speed often reduces the operation range of the entire hybrid hydraulic system and thus reduces system effectiveness.

In most cases, multi-speed driveline integrated designs help to reduce the limitations indicated above. However, the additional cost, complexity and weight of such multi-speed designs detract from the feasibility of multi-speed designs. Ultimately the functionality of such multi-speed interface systems duplicates the functionality of the vehicle transmission and is therefore redundant.

Therefore, the motor/pump unit of the current driveline integrated hybrid hydraulic drive systems is relatively large in size, heavy and bulky.

Accordingly, it is the intent of this invention to overcome these shortcomings of the prior art, and more specifically, to overcome specific packaging and performance limitations of a driveline mounted regenerative drive system.

SUMMARY OF THE INVENTION

A hybrid electro-hydraulic drive system in accordance with the exemplary embodiments of the present invention is provided for a motor vehicle having at least one pair of drive wheels. The hybrid electro-hydraulic drive system of the present invention comprises a hydraulic transmission including a first hydraulic machine and at least one second hydraulic machine drivingly connected to the drive wheels of the motor vehicle for driving thereof, an electric motor/generator operatively connected to the first hydraulic machine, and at least one energy storage device operable to store and release a hydraulic fluid energy or an electrical energy. The second hydraulic machine is a reversible hydraulic pump/motor unit capable to function both as a hydraulic pump and a hydraulic motor. The energy storage device is operatively connected to either the hydraulic transmission or the electric motor/generator. The hybrid drive system is arranged such that in a retarding mode the hydraulic transmission and/or the electric motor/generator retard the drive wheels of the vehicle, while in a driving mode they supply a supplementary power to the drive wheels of the vehicle to assist propulsion of the vehicle.

The hybrid electro-hydraulic drive system in accordance with the present invention provides a number of advantages over the current hydraulic or electric regenerative drive systems of equivalent performance levels.

BRIEF DESCRIPTION OF THE DRAWINGS

Other objects and advantages of the invention will become apparent from a study of the following specification when viewed in light of the accompanying drawings, wherein:

FIGS. 4A and 4B illustrate the cylinder of the digital-displacement pump/motor unit of the present invention in a pumping mode;

FIGS. 5A and 5B illustrate the cylinder of the digital-displacement pump/motor unit of the present invention in a motoring mode;

DETAILED DESCRIPTION OF PREFERRED EMBODIMENTS

The preferred embodiments of the present invention will now be described with the reference to accompanying drawings.

Figure 1:
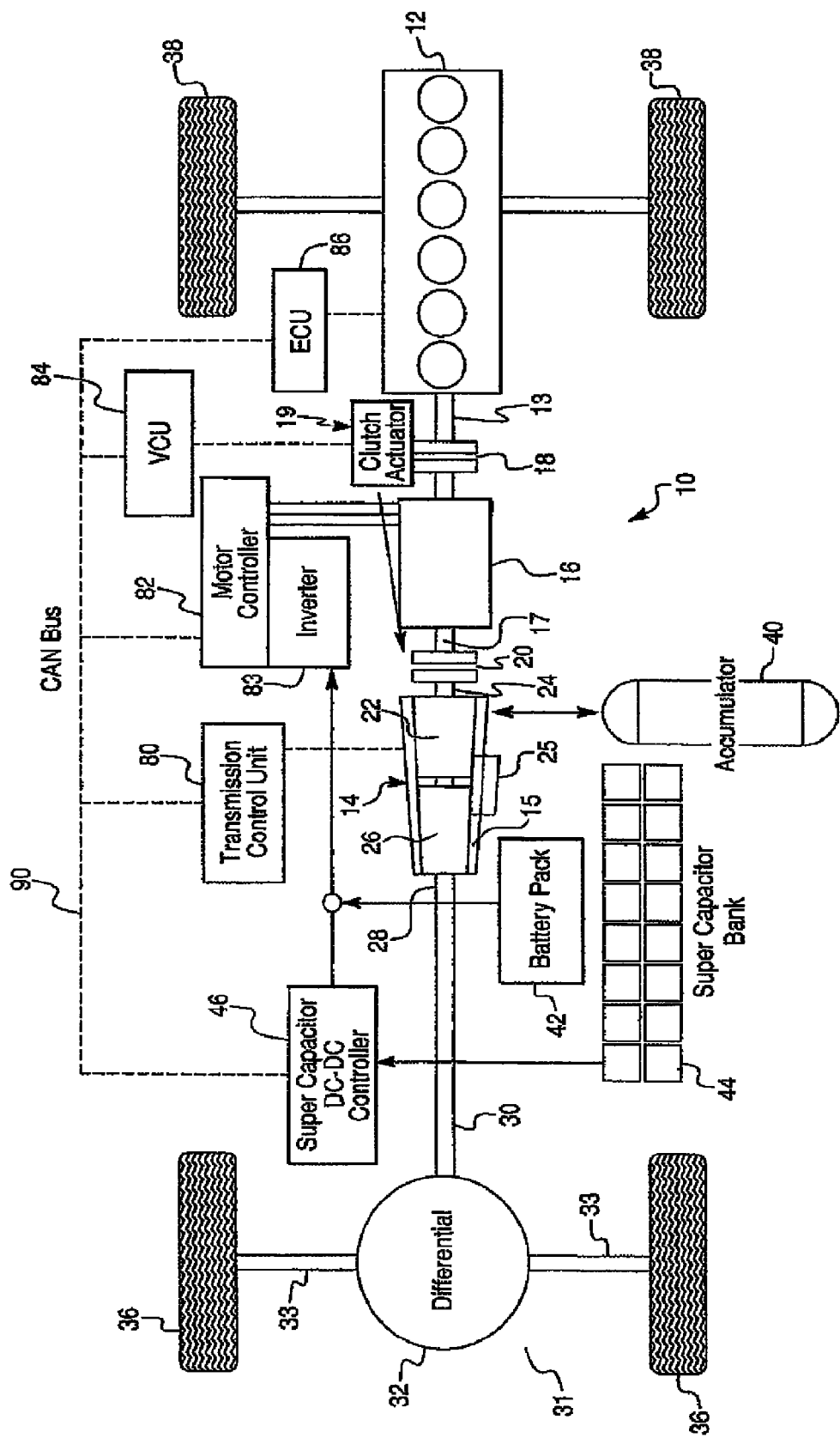
FIG. 1 is a schematic view of a hybrid drive systems in accordance with a first exemplary embodiment of the present invention.
Figure 2A:
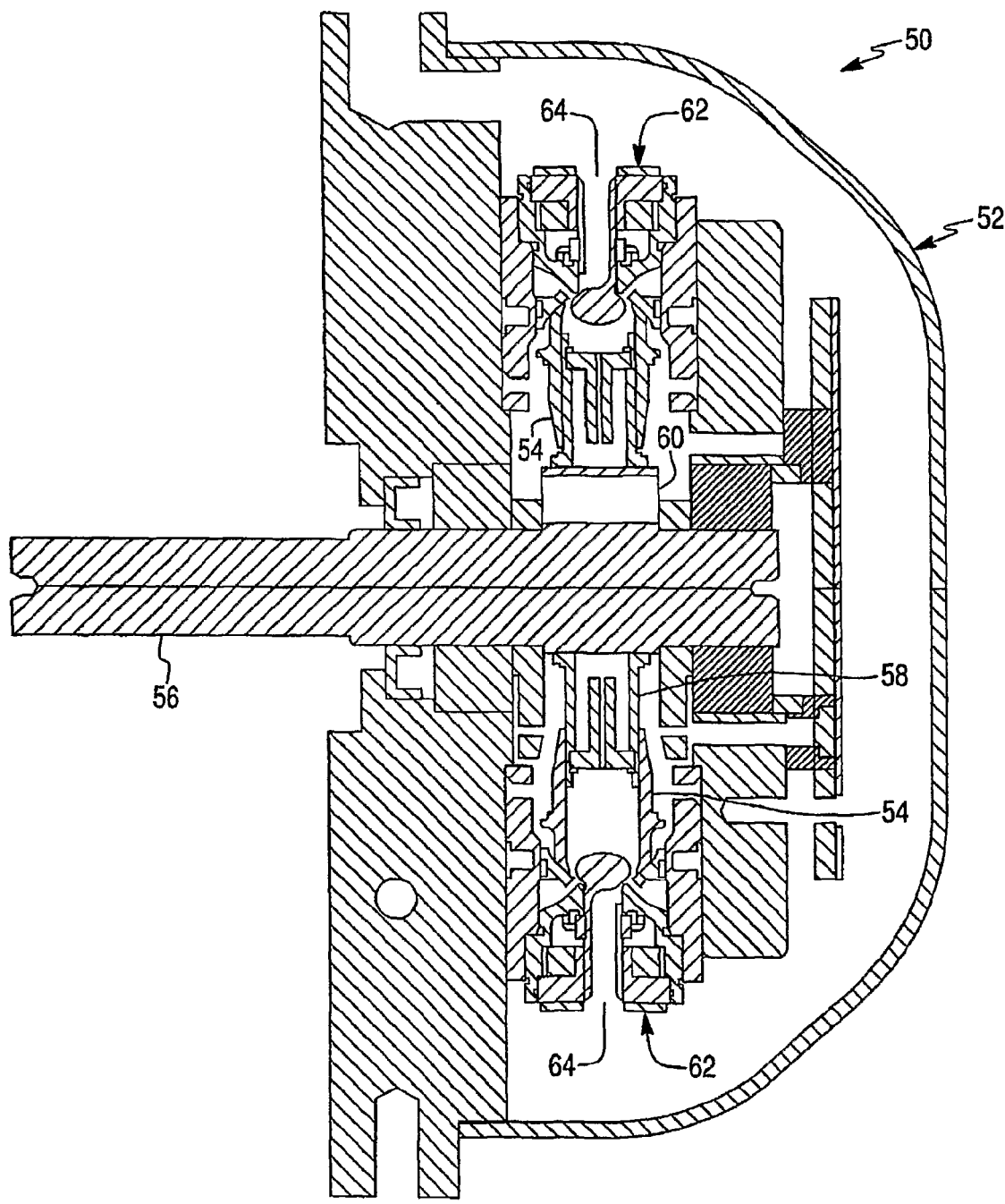
FIG. 2A is an axial cross-sectional view of a digital-displacement pump/motor unit of the present invention.
Figure 2B:
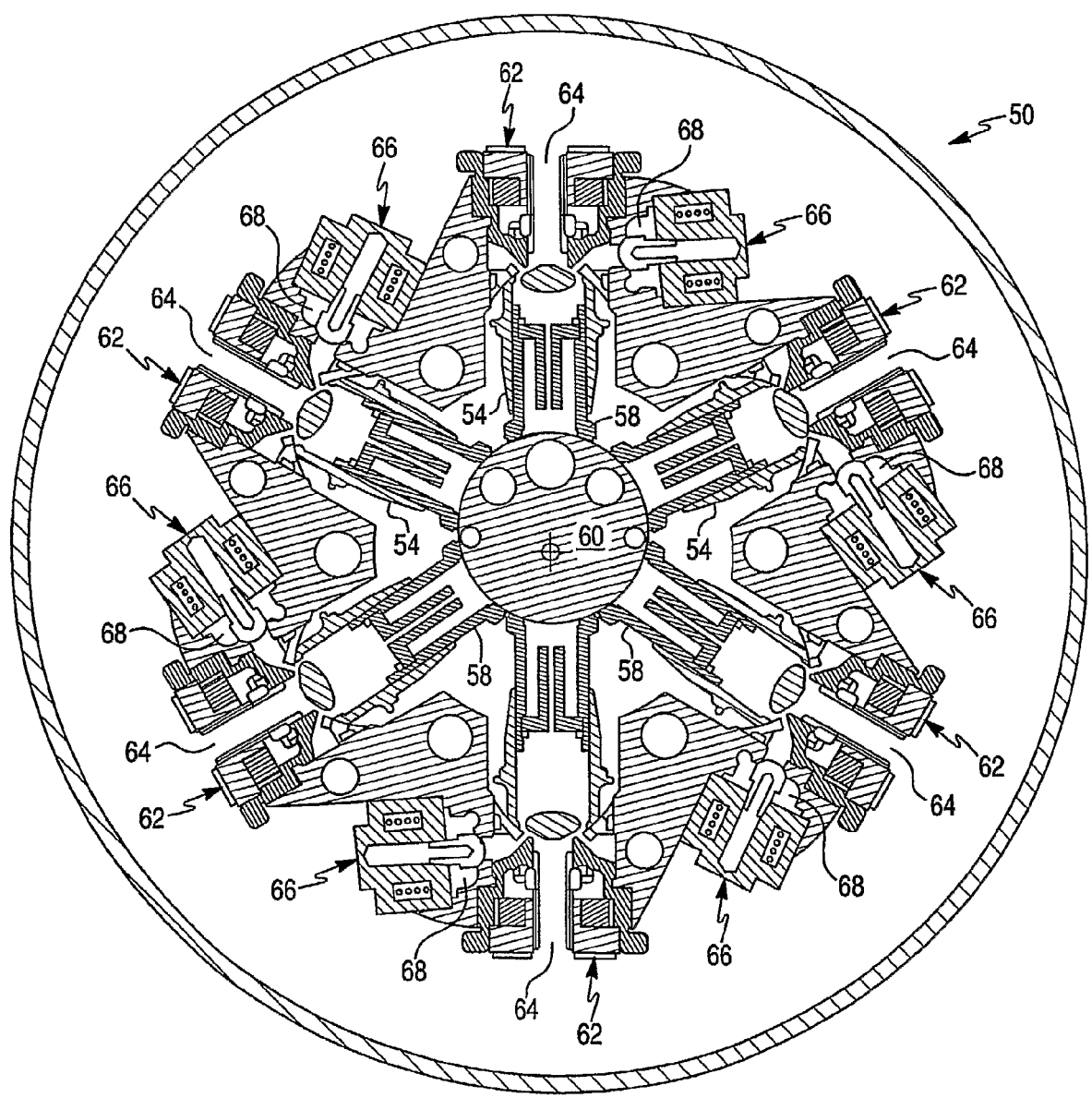
FIG. 2B is a radial cross-sectional view of the digital-displacement pump/motor unit of the present invention.
Figure 3:
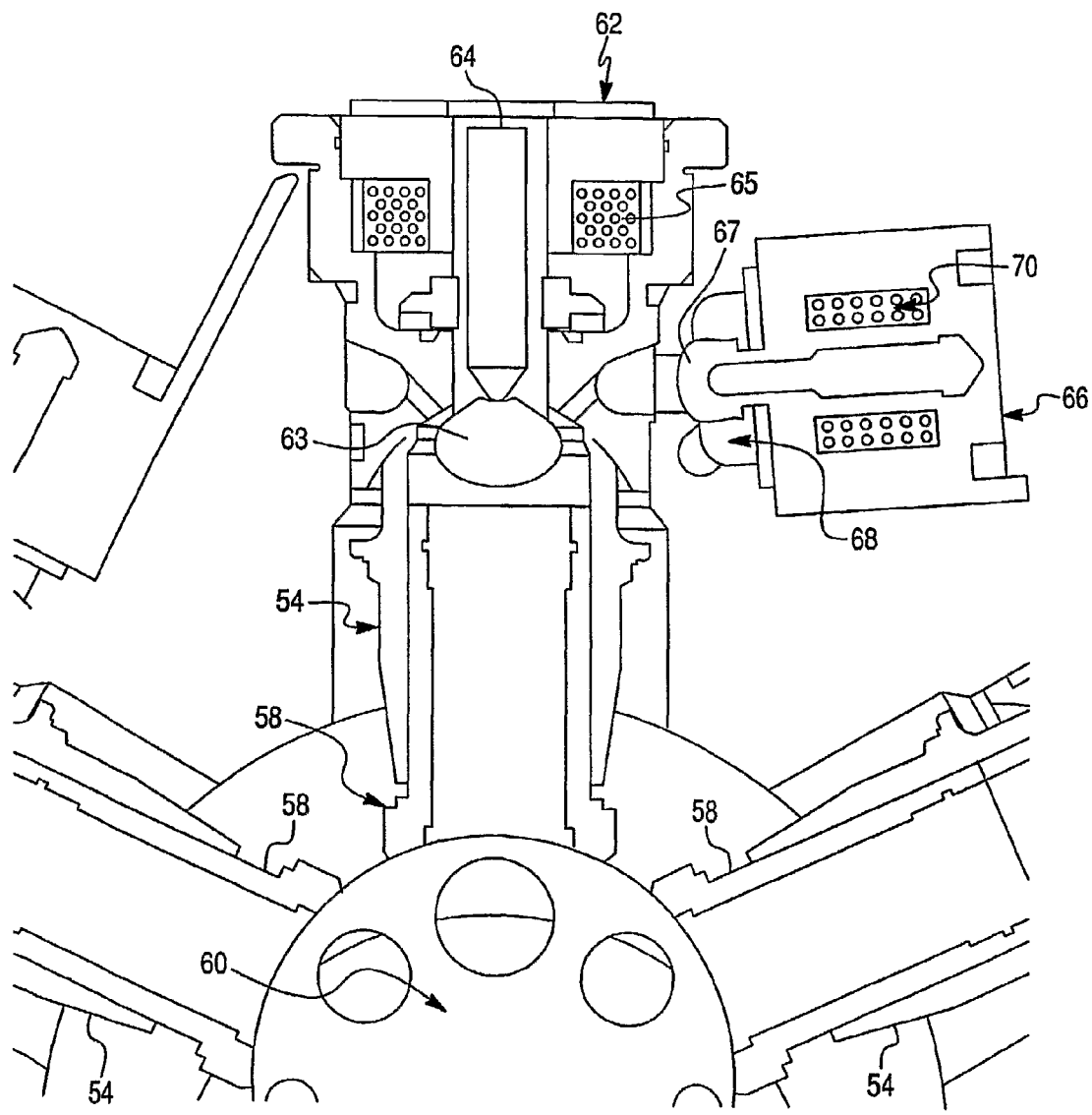
FIG. 3 is an enlarged view of one cylinder of the digital-displacement pump/motor unit of the present invention.
Figure 6A:
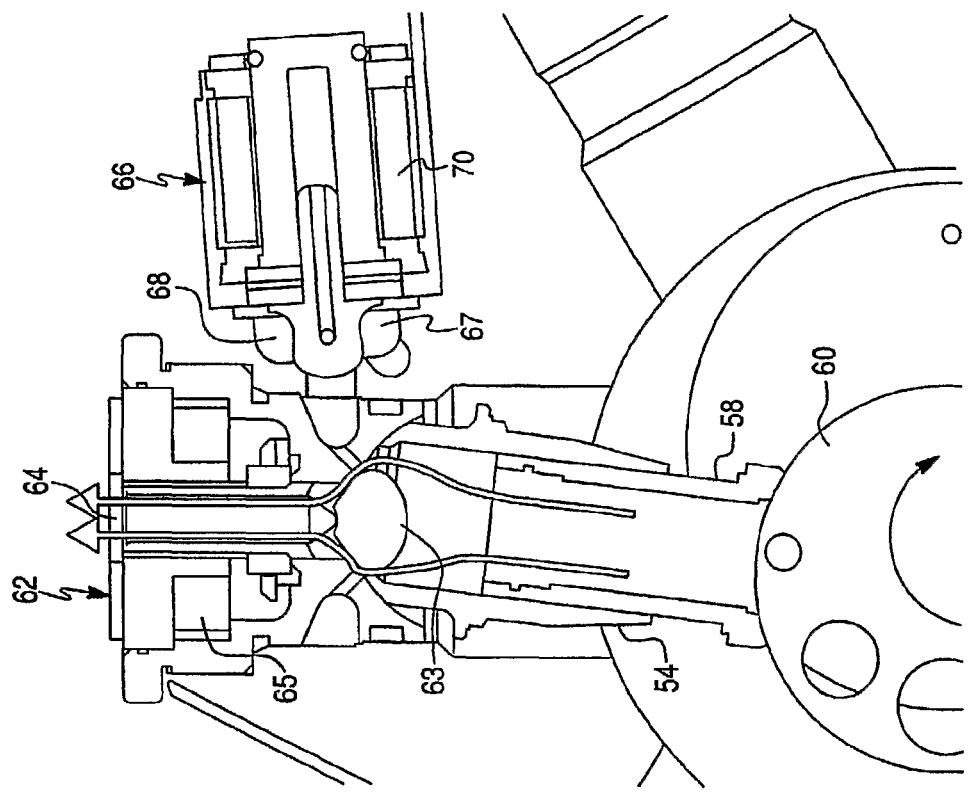
FIGS. 6A and 6B illustrate the cylinder of the digital-displacement pump/motor unit of the present invention in an idling mode.
Figure 6B:
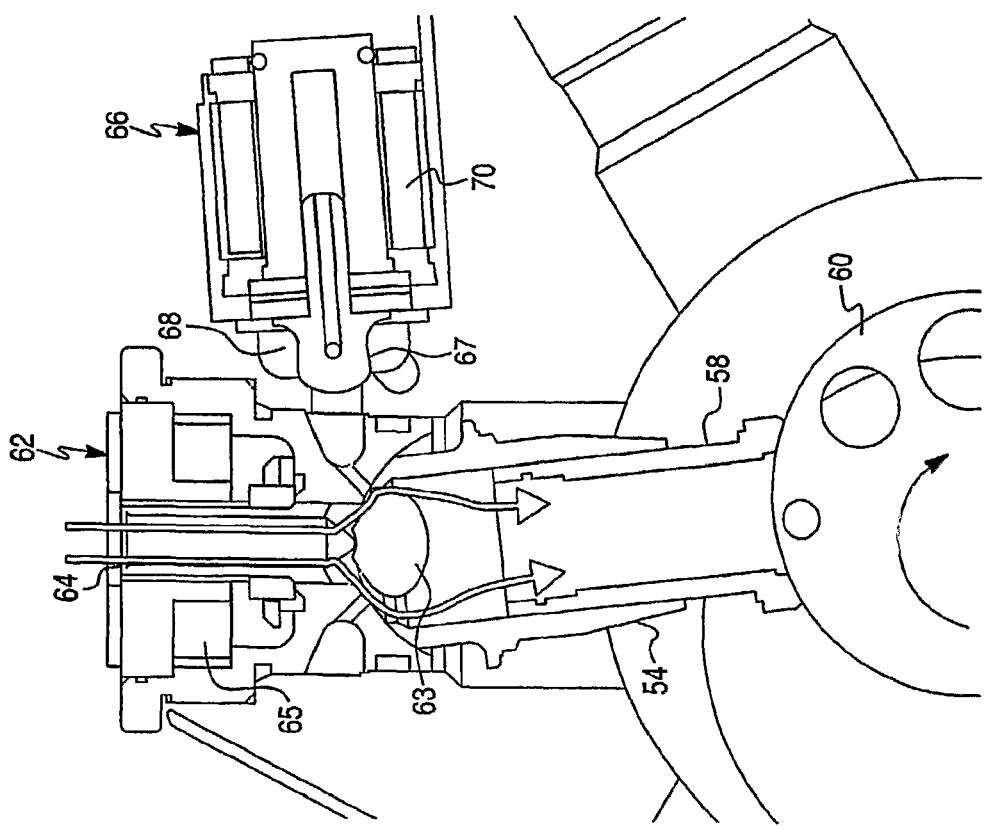

FIG. 1 schematically depicts a hydroelectric hybrid drive system 10 in accordance with a first exemplary embodiment of the present invention for application in a motor vehicle. The hybrid drive system 10 comprises a prime mover, such as an internal combustion engine (IC engine) 12, a hydraulic transmission 14, and an electric motor/generator (M/G) 16 interposed between the IC engine 12 and the hydraulic transmission 14. In other words, the hydraulic transmission 14 and the electric motor/generator 16 are connected to the internal combustion engine 12 in series. Preferably, the hydraulic transmission 14 is an infinitely variable hydrostatic transmission (IVT) including a first hydraulic machine 22 having an input shaft 24, and a second hydraulic machine 26 having an output shaft 28. The first and second hydraulic machines 22 and 26 are hydraulically connected to each other through a communication line 25. Preferably, the electric motor/generator 16 is a DC electric machine.

As further illustrated in FIG. 1, the M/G 16 is selectively and operatively coupled to the IC engine 12 through a clutch 18 and to the hydraulic transmission 14 through a clutch 20. More specifically, a crankshaft 13 of the IC engine 12 is selectively connectable to a rotor shaft 17 of the electric motor/generator 16 through the clutch 18, while the rotor shaft 17 of the electric motor/generator 16 is selectively connectable to the input shaft 24 of the first hydraulic machine 22 of the IVT 14 through the clutch 20.

Preferably, each of the first and second hydraulic machines 22 and 26, respectively, is a reversible hydraulic pump/motor unit capable to function both as a hydraulic pump and a hydraulic motor. Alternatively, the first hydraulic machine 22 is a hydraulic pump unit capable to function a hydraulic pump only. Further preferably, each of the first and second hydraulic machines 22 and 26, respectively, is in the form of a digital-displacement (DD) pump/motor unit, such as a DD reciprocating (radial or axial) hydraulic machine, swash (wobble) plate hydraulic machine, etc. Examples of the DD pump/motor units are described in U.S. Pat. Nos. 5,190,446 and 5,259,738, European patent specification EP 0 494 236 B1, WO 2005/095800, WO 2004/025122 and WO 03/052302, the contents of each of which are incorporated herein by reference.

The exemplary embodiment of the reciprocating DD pump/motor unit employed in the present invention is illustrated in detail in FIGS. 2A, 2B, 3, 4A, 4B, 5A, 5B, 6A and 6B and is generally depicted with the reference numeral 50. The DD pump/motor unit 50 comprises a casing 52 housing a bank of cylinders 54 extending radially outwardly from a drive shaft 56, a plurality of pistons 58 disposed within the cylinders 54, an eccentric 60 drivingly coupled to the drive shaft 56 arranged so that rotation of the eccentric 60 causes the pistons 58 to reciprocate within the cylinders 54.

Moreover, each of the cylinders 54 is provided with a low-pressure (LP) valve assembly 62 and a high-pressure (HP) valve assembly 66. More specifically, as illustrated in detail in FIG. 3, the LP valve assembly 62 includes a poppet valve 63 movable between a closed position blocking a low-pressure (LP) port 64 to an open position allowing fluid communication between a fluid chamber within the cylinder 54 and a low-pressure manifold through the LP port 64. Similarly, the HP valve assembly 66 includes a poppet valve 67 movable between a closed position blocking a high-pressure (HP) port 68 to an open position allowing fluid communication between the fluid chamber within the cylinder 54 and a high-pressure manifold through the UP port 68. Furthermore, each of the LP and HP valve assemblies 62 and 64 is equipped with an electromagnetic actuator, 68 and 70, respectively, provided for operating and actively controlling the corresponding poppet valves 63 and 65, respectively, which rectify the flow into, and out of, each cylinder 54. Preferably, the each of the electromagnetic actuators 68 and 70 is in the form of a small electromagnetic coil (solenoid) so that the corresponding poppet valves 63 and 65 can be opened and closed on a stroke-by-stroke basis.

The solenoid coil in each of the electro-magnetic actuators 68 and 70 is activated by a power FET, which is in turn connected directly to a digital output of an embedded electronic controller at precise times, near the ends of the stroke, in order to establish fluid connection between the moving piston 58 and the appropriate manifold. This control allows the DD pump/motor unit 50 to behave in any of the three modes: a pumping mode (functioning as a hydraulic pump and adding fluid from the high pressure manifold) illustrated in FIGS. 4A and 4B, a motoring mode (functioning as a hydraulic motor and subtracting fluid from the high pressure manifold) illustrated in FIGS. 5A and 5B and an idling mode effectively disabling the DD pump/motor unit 50 illustrated in FIGS. 6A and 6B. When idling the fluid flows in and out around the LP valve 63. The HP valve 65 remains closed to isolate the cylinder 54 from the high pressure fluid.

The function of each cylinder can be changed at each end of each stroke. The result of the rapid sequenced valve actuation is that, at the end of each stroke, each cylinder can be reconfigured to either pump, motor or idle. By controlling the sequence of cylinder enablings, the DD pump/motor unit 50 can pump fluid to the high-pressure manifold or accept it back (while the returning fluid actually helps to drive the drive shaft 56 of the machine 50) at infinitely variable flow-rates. The DD pump/motor unit 50 maintains high efficiency over its whole operating range, making it suitable for use in many industrial applications, including the motor vehicles, where efficiency is very important. The electronic control and ultrafast response of the DD pump/motor unit 50 provides very good driveability as well. Moreover, the hydraulic transmission using the DD pump/motor units is about a third the size and weight of a similar electric hybrid transmission.

Furthermore, as the valves are actuated at times in the cycle when there is almost no pressure difference across them, the actuators can be compact and use little power. Either permanent magnets or springs are used to maintain the disabled poppet valves at default positions. The controller controls the valves from its output port via a bank of power semiconductors. The DD pump/motor unit 50 can be run under pressure-control, flow-control or ternary-mode of cylinder enabling.

Advantages of using the DD pump/motor unit include:

Fast response: These hydraulic machines are capable of attaining either full or zero output from any starting condition, in less than a single shaft revolution.

Compatibility with micro-processor: The compatibility with micro-processors allows the use of advanced control logic. Also the same machine can be used as a pump, a motor or both.

Higher efficiency: As disabled cylinders are not pressurized, losses are reduced in comparison with swash-plate machines leading to higher efficiency, especially at part load.

Moreover, banks of cylinders can be assembled along a common drive shaft to allow multiple independent outputs. Unlike conventional hydraulic machines, banks of radial pump-motors can be combined along a common shaft and used as a summing junction of both torque and power whilst providing isolation between services. Accumulators may be used in conjunction with some of the banks to transfer power in or out of the system. The radial configuration provides good force balancing and gives optimal space for the mechanical components like valves and bearings.

The IVT 14 equipped with the DD pump/motor units as the first and second hydraulic machines 22 and 26, respectively, (hereinafter referred to as the DD IVT) provides a continuously variable, multi-range transmission capable of propelling the motor vehicle in a most efficient manner by changing transmission ratio to precisely match engine power to output load. In fact, engine power may be held at the engine's point of peak operating efficiency as the vehicle is accelerated from rest to maximum speed. Further, the DD IVT 14 offers a smooth, stepless power flow across the entire operating range without cycling and shock loading to the vehicle drive system, thus, affording the capability to precisely match engine power to varying output loads to achieve optimum fuel economy as well as acceleration and overall vehicle performance. The DD pump/motor unit is ideal for building series hydraulic hybrid transmissions for automotive applications. Series hydraulic hybrid transmissions built with the DD pump/motor units can offer impressive fuel savings, packagability improvements, performance enhancement and cost savings over conventional transmissions.

The hydrostatic transmission 14 according to the first exemplary embodiment of the present invention integrates the first and second hydraulic machines 22 and 26 in one unit within a transmission casing 15 to minimize fluid flow losses.

The vehicle drive system 10 further comprises a rear drive axle assembly 31 including a differential 32 and a pair of opposite rear axle shafts 33 transmitting torque from the differential 32 to rear drive wheels 36. The output shaft 28 of the IVT 14 is drivingly connected to the differential 32 of the rear drive axle assembly 31 through a rear drive shaft 30. More specifically, the rear drive shaft 30 of the vehicle drive system 10 drivingly couples the IVT 14 to rear drive wheels 36 of the rear drive axle assembly 31.

As further illustrated in FIG. 1, the DD IVT 14 is controlled by an electronic transmission control unit (TCU) 80, the M/G 16 is controlled by an electronic motor controller 82 connected to an inverter 83, while the IC engine 12 is controlled by an electronic engine control (ECU) unit 86. More specifically, the TCU 80 controls poppet valves of the first and second digital-displacement pump/motor units 22 and 26, respectively. The clutches 18 and 20 are operated by a clutch actuator 19, which, in turn, is controlled by an electronic vehicle control unit (VCU) 84. The clutch actuator 19 may of any appropriate type known in the art, such as hydraulic, electromagnetic or solenoid, electro-hydraulic, etc.

All of the control units 80, 82, 84 and 86 of the hybrid drive system 10 are connected to a controller area network (CAN) bus 90 of the motor vehicle. The CAN is a serial bus system especially suited for networking "intelligent" devices as well as sensors and actuators within a system or sub-system. The CAN is a serial bus system with multi-master capabilities, that is, all CAN nodes are able to transmit data and several CAN nodes can request the bus simultaneously. The serial bus system has real-time capabilities, and in CAN networks there is no addressing of subscribers or stations in the conventional sense, but instead, prioritized messages are transmitted. A transmitter sends a message to all CAN nodes (broadcasting). Each node decides on the basis of the identifier received whether it should process the message or not. The identifier also determines the priority that the message enjoys in competition for bus access. The relative simplicity of the CAN protocol means that very little cost and effort need to be expended on personal training; the CAN chips interfaces make applications programming relatively simple. Introductory courses, function libraries, starter kits, host interfaces, I/O modules and tools are available from a variety of vendors permitting low-cost implementation of CAN networks. Low-cost controller chips implementing the CAN data link layer protocol in silicon and permitting simple connection to microcontrollers have been available since at least 1989.

The hybrid drive system 10 in accordance with the first exemplary embodiment of the present invention further includes at least one high-pressure hydraulic accumulator 40 fluidly connected to the hydraulic transmission 14. The high-pressure hydraulic accumulator 40 is operable to store and release a pressurized fluid generated by the hydraulic transmission 14. Preferably, the high-pressure hydraulic accumulator 40 of the present invention is a hydro-pneumatic accumulator, such as a nitrogen charged hydraulic accumulator. It will be appreciated that any other types of the hydraulic accumulators may be employed. Moreover, the hybrid drive system 10 further includes an electric storage battery pack 42 electrically connected to the inverter 83 of the M/G 16 and a bank of super-capacitors 44 electrically connected to the inverter 83 through a super capacitor DC-DC controller 46. The hydraulic and electric energy storage devices can be used to store braking energy of the motor vehicle and the stored energy can be reused to start the engine and/or accelerate the vehicle.

Preferably, the electric motor/generator 16 is a DC electric machine. However, alternatively, the motor/generator 16 may be in the form of an appropriate AC electric machine.

In operation of the hybrid drive system 10 in accordance with the first exemplary embodiment of the present invention, the internal combustion engine 12 is employed as a primary power and torque source, while the hydraulic transmission 14 and the motor/generator 16 are used to recuperate kinetic energy of the motor vehicle during deceleration and are supplementary sources of the power and torque.

The hybrid (or regenerative) drive system 10 is operable in at least three modes of operation depending on the operating conditions of the motor vehicle and particular demands of a vehicle operator, including a retarding mode, a driving mode and a neutral mode.

In the retarding mode, as an external source of the kinetic energy drives the second hydraulic machine (pump/motor unit) 26 through the rear drive shaft 30 of the vehicle drive system 10, the pump/motor unit 32 functions as a hydraulic pump. Consequently, the second hydraulic machine 26 generates a pressurized hydraulic fluid supplied to the high-pressure hydraulic accumulator 40. The load required to drive the second hydraulic machine (functioning as a pump) 26 creates a retardation force on the rear wheels 36. Thus, in the retarding the second pump/motor unit 26 retards the drive wheels 36 of the motor vehicle by pumping hydraulic fluid into the energy storage accumulator 40.

Moreover, in the retarding mode, the IVT 14 is capable to drive the electric motor/generator 16 (when the clutch 20 is engaged and the second pump/motor unit 26 is functioning as a pump, while the first pump/motor unit 22 is functioning as a motor). In this case, the electric motor/generator 16 is capable to generate electricity when working as the generator, which is supplied to the battery 42 and/or to the bank of super-capacitors 44.

In the driving mode, the stored braking energy of the motor vehicle can be reused to start the engine and/or accelerate the vehicle. More specifically, the pressurized hydraulic fluid is released from the hydraulic storage accumulators 40 to drive the IVT 14, and/or the electric energy is released from the electric storage battery pack 42 and/or the bank of super-capacitors 44 to drive the electric motor/generator 16 functioning as the motor. In turn, the electric motor/generator 16 drives the engine (to start the engine) when the clutch 18 is engaged, and drives the first pump/motor unit 22 of the IVT 14 to propel the motor vehicle. The hybrid drive system 10 allows purely hydraulic or electrical operation of the motor vehicle, as well as combination thereof, when the power demand is low. It will be appreciated that storing reclaimed energy in the hydraulic and electric energy storage devices greatly improves urban cycle efficiency of the motor vehicle.

Furthermore, the hybrid drive system 10 in accordance with the first exemplary embodiment of the present invention permits the motor vehicle start moving using energy stored in the hydraulic accumulator and/or in the electric energy storage device without any engine power at all, allowing the engine to stop when in traffic yet retaining immediate response to accelerator pedal input. More specifically, the hydraulic transmission 14 with the use of stored hydraulic energy in the hydraulic accumulator 40 can propel the vehicle in a forward or reverse direction and/or spin the engine 12 up to firing speed when the clutches 18 and 20 are engaged. Similarly, the electric motor/generator 16 with the use of stored electric energy in the battery 42 and/or super-capacitor bank 46 can spin the engine 12 up to firing speed (when the clutch 18 is engaged) and at the same time supply torque and speed to the first pump/motor unit 22 of the DD IVT 14 (when the clutch 20 is engaged) so that the pump unit 22 can provide flow and pressure to the second pump/motor unit 26 of the IVT 14 to propel the vehicle in a forward or reverse direction.

The hybrid drive system 10 in accordance with the present invention allows for the engine to be turned off at a stop or vehicle idle condition which increases fuel economy and does not allow harmful emissions to be emitted by the vehicle because the engine is turned off.

Moreover, the electric energy stored in the electric storage battery pack 42 and/or the bank of super-capacitors 44, may be supplied to various auxiliary electric units provided in the motor vehicle, such as HVAC, an engine starter, etc. Also, the stored electric energy provides a source of electrical power for various utility applications, i.e. power saws, generator, lights, etc.

The engine 12 is coupled to the DD IVT 14 and the electric motor/generator 16 with a set of clutches 18 and 20 that can be engaged or disengaged to meet a plurality of conditions, including, but not limited to:

Engine 12 power and torque is transferred through the DD IVT 14 to the vehicle drive wheels 36;

Electric motor 16 power and torque is transferred through the DD IVT 14 to the vehicle drive wheels 36;

Electric motor 16 and engine 12 power and torque are transferred through the DD IVT 14 to the vehicle drive wheels 36;

The hydraulic energy stored in the high-pressure hydraulic accumulator 40 is transferred to the vehicle drive wheels 36 and/or to the engine 12 so as to reuse the braking energy of the vehicle to start the engine and/or accelerate the vehicle.

Therefore, the hybrid drive system 10 of the present invention provides the advantage of combining the DD IVT ratio span with the regenerative braking and vastly improves fuel economy and emissions both in stop/start driving and continuous driving at highway speeds. Additionally, the present invention provides a source of electrical power for various utility applications, i.e. power saws, generator, lights, etc.

Figure 7:
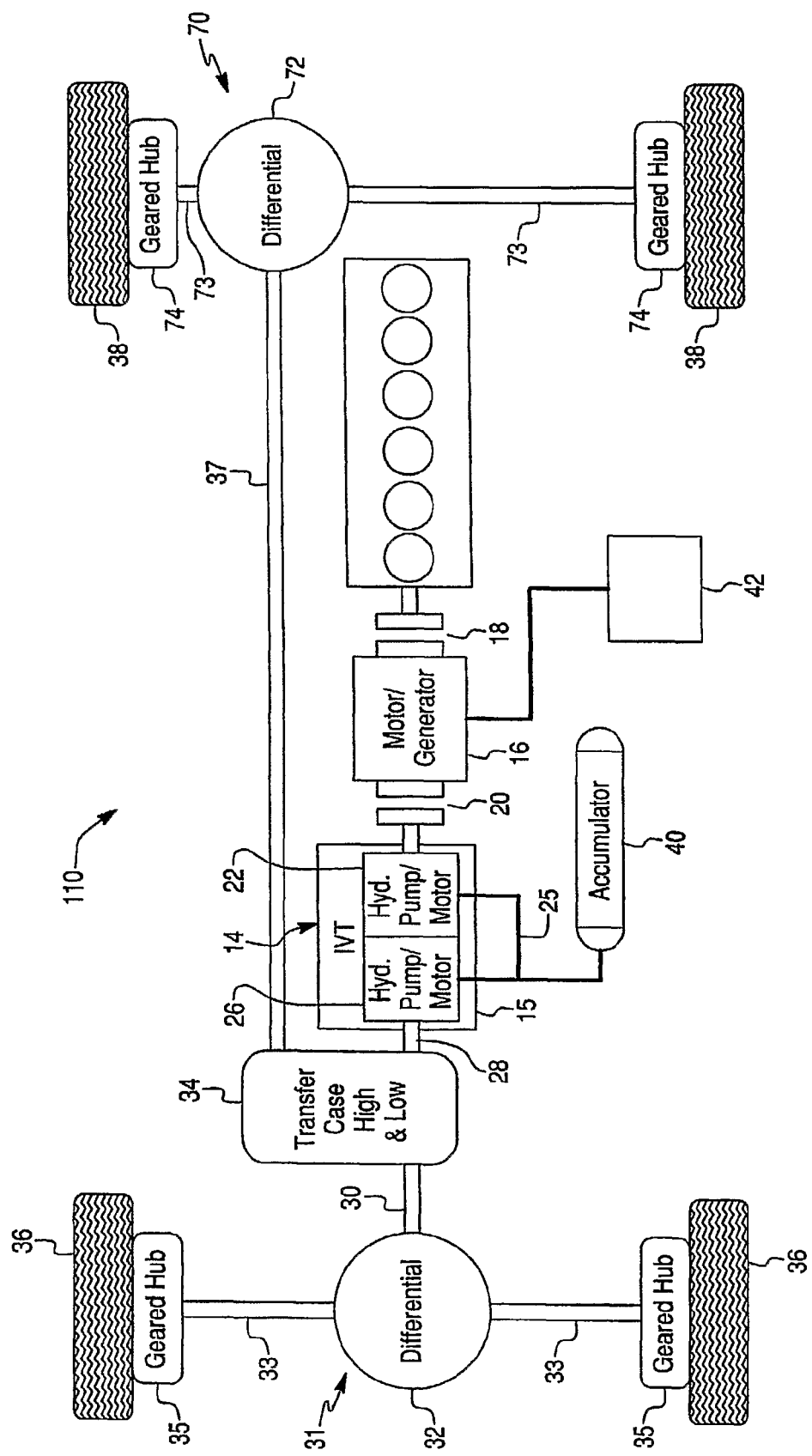
FIG. 7 is a schematic view of a hybrid drive systems in accordance with a second exemplary embodiment of the present invention.

FIG. 7 of the drawings illustrates a second exemplary embodiment of a hydroelectric hybrid drive system for motor vehicles, generally depicted with the reference numeral 110. Components, which are unchanged from, or function in the same way as in the first exemplary embodiment depicted in FIGS. 1-6 are labeled with the same reference numerals, sometimes without describing detail since similarities between the corresponding parts in the two embodiments will be readily perceived by the reader. Thus, only the portions of the hybrid drive system, which differ, will therefore be explained in detail below.

FIG. 7 schematically depicts the hydroelectric hybrid drive system 110 in accordance with the second exemplary embodiment of the present invention for application in an all-wheel-drive (AWD) motor vehicle. The hybrid drive system 110 comprises an internal combustion engine 12 as a prime mover, a hydraulic transmission 14, and an electric motor/generator (M/G) 16 interposed between the IC engine 12 and the hydraulic transmission 14, and electrically connected to the electric energy storage device, such as the electric storage battery pack 42 (as shown in FIG. 7) or the bank of super-capacitors 44. As further illustrated in FIG. 7, the M/G 16 is selectively and operatively coupled to the IC engine 12 through a clutch 18 and to the hydraulic transmission 14 through a clutch 20. Preferably, the hydraulic transmission 14 is an infinitely variable hydrostatic transmission (IVT) including a first hydraulic machine 22 having an input shaft 24, and a second hydraulic machine 26 having an output shaft 28 hydraulically connected to each other through a communication line 25.

The output shaft 28 of the IVT 14 is drivingly connected to a driveline of the vehicle drive system 110 including a rear drive shaft 30 and a front drive shaft 37 through a transfer case 34, which can be a multi-speed transfer case. The transfer case 34 apportions a drive torque of the output shaft 28 of the IVT 14 between a rear drive axle assembly 31 and a front drive axle assembly 70. More specifically, the rear drive shaft 30 of the vehicular driveline drivingly couples the IVT 14 to rear drive wheels 36 of the rear drive axle assembly 31 through gear hubs 35, while the front drive shaft 37 drivingly couples the output shaft 28 of the transmission 14 to front drive wheels 38 of the front drive axle assembly 70. The front drive axle assembly 70 includes a differential 72 and a pair of opposite front axle shafts 73 transmitting torque from the differential 72 to the front drive wheels 38 through corresponding gear hubs 74. The output shaft 28 of the IVT 14 is drivingly connected to the differential 32 of the rear drive axle assembly 31 through a rear drive shaft 30.

Figure 8:
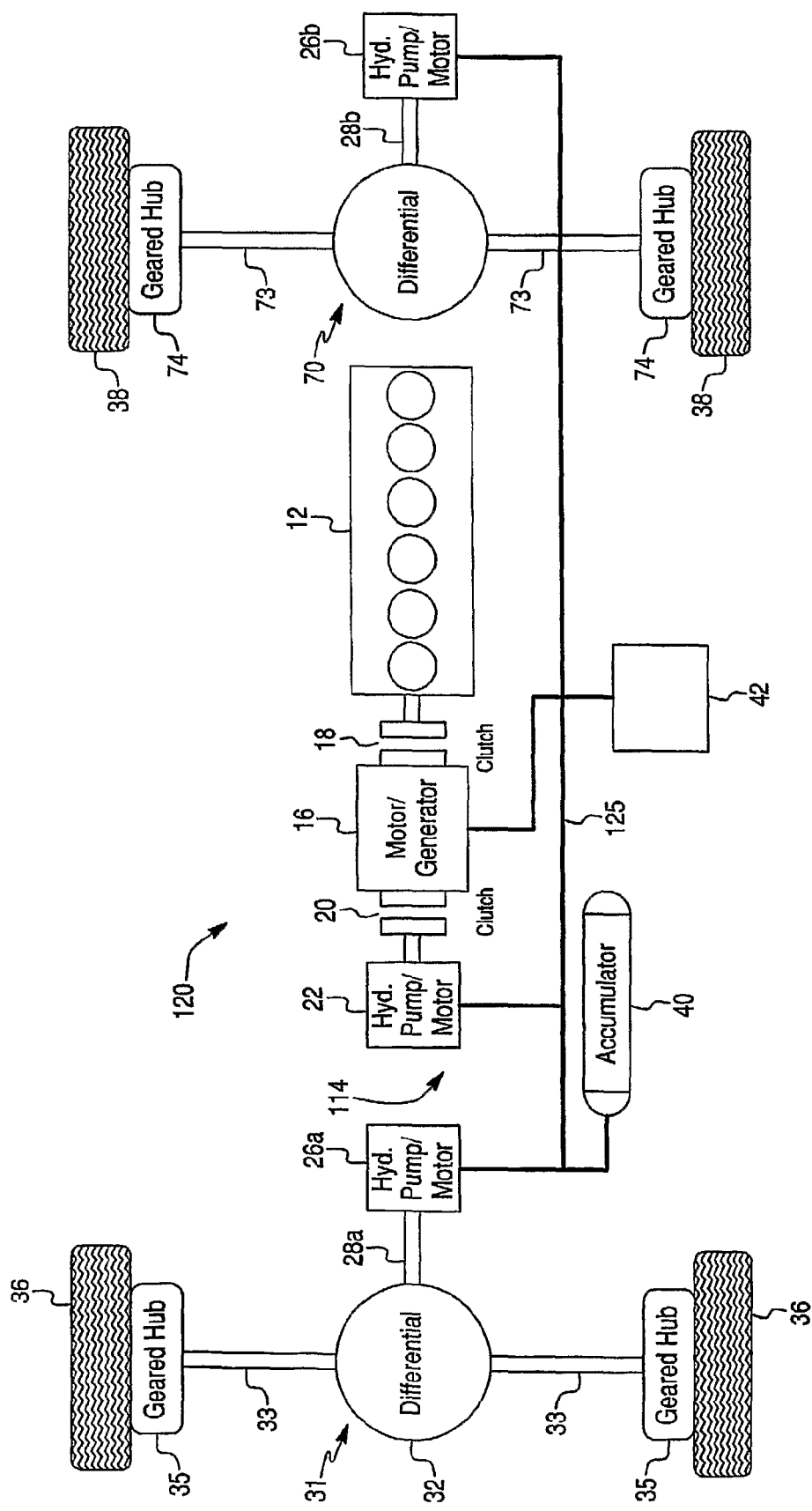
FIG. 8 is a schematic view of a hybrid drive systems in accordance with a third exemplary embodiment of the present invention.

FIG. 8 of the drawings illustrates a third exemplary embodiment of a hydro-electric hybrid drive system for motor vehicles, generally depicted with the reference numeral 120. Components, which are unchanged from, or function in the same way as in the first and second exemplary embodiments depicted in FIGS. 1-7 are labeled with the same reference numerals, sometimes without describing detail since similarities between the corresponding parts in the embodiments will be readily perceived by the reader.

FIG. 8 schematically depicts the hydroelectric hybrid drive system 120 in accordance with the third exemplary embodiment of the present invention for application in an all-wheel-drive (AWD) motor vehicle. The hybrid drive system 120 comprises an internal combustion engine 12 as a prime mover, a hydraulic transmission 114, and an electric motor/generator (M/G) 16 interposed between the IC engine 12 and the hydraulic transmission, and electrically connected to the electric energy storage device, such as the electric storage battery pack 42 (as shown in FIG. 8) or the bank of super-capacitors 44.

The hydraulic transmission 114 according to the third exemplary embodiment of the present invention is an infinitely variable hydrostatic transmission (IVT) including a first hydraulic machine 22 having an input shaft 24, and a two second hydraulic machines 26a and 26b each having an output shaft (28a and 28b, respectively). The first hydraulic machine 22 and the second hydraulic machines 26a and 26b are hydraulically connected to each other through a communication line 125. More specifically, one of the second hydraulic machines 26a is associated with a rear drive axle assembly 31 and is provided for driving rear drive wheels 36 through gear hubs 35, while the other of the second hydraulic machines 26b is associated with a front drive axle assembly 70 and is provided for driving front drive wheels 38 through gear hubs 74.

As further illustrated in FIG. 8, the electric motor/generator 16 is selectively and operatively coupled to the IC engine 12 through a clutch 18 and to the first hydraulic machine 22 of the hydraulic transmission 114 through a clutch 20.

Figure 9:
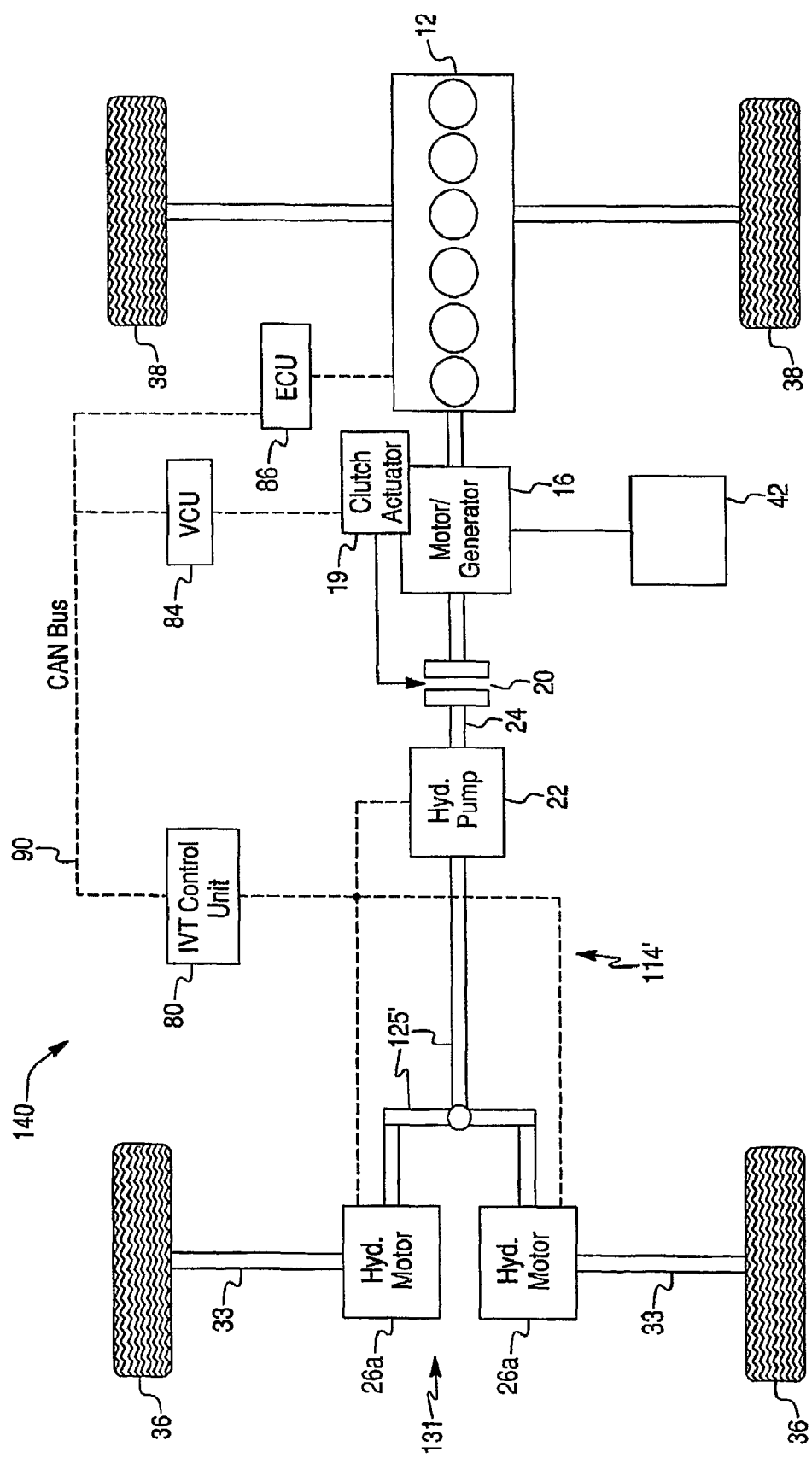
FIG. 9 is a schematic view of a hybrid drive systems in accordance with a fourth exemplary embodiment of the present invention.

FIG. 9 of the drawings illustrates a fourth exemplary embodiment of a hydro-electric hybrid drive system for motor vehicles, generally depicted with the reference numeral 140. Components, which are unchanged from, or function in the same way as in the first through third exemplary embodiments of the present invention depicted in FIGS. 1-8 are labeled with the same reference numerals, sometimes without describing detail since similarities between the corresponding parts in the embodiments will be readily perceived by the reader.

FIG. 9 schematically depicts the hydroelectric hybrid drive system 140 in accordance with the fourth exemplary embodiment of the present invention for application in a rear-wheel-drive (RWD) motor vehicle. The hybrid drive system 140 comprises an internal combustion engine 12 as a prime mover, a hydraulic transmission 114', and an electric motor/generator 16 interposed between the IC engine 12 and the hydraulic transmission 114'. By contrast to the first, second and third embodiments of the present invention the electric motor/generator 16 is permanently drivingly coupled to the IC engine 12, and electrically connected to the electric energy storage device, such as the electric storage battery pack 42 (as shown in FIG. 9) or the bank of super-capacitors 44.

The hydraulic transmission 114' according to the fourth exemplary embodiment of the present invention is an infinitely variable hydrostatic transmission (IVT) including a first hydraulic machine 22 having an input shaft 24, and two second hydraulic machines 26a and 26b each having an output shaft in the form of rear axle shafts 33 transmitting torque from each of the second hydraulic machines 26a and 26b to corresponding rear drive wheels 36. The first hydraulic machine 22 and the second hydraulic machines 26a and 26b are hydraulically connected to each other through a communication line 125'. In other words, both of the second hydraulic machines 26a and 26b are associated with a rear drive axle assembly 131 and are provided for driving the rear drive wheels 36.

As further illustrated in FIG. 9, the electric motor/generator 16 is permanently drivingly coupled to the IC engine 12 and selectively and operatively coupled to the first hydraulic machine 22 of the hydraulic transmission 114' through a clutch 20.

Figure 10:
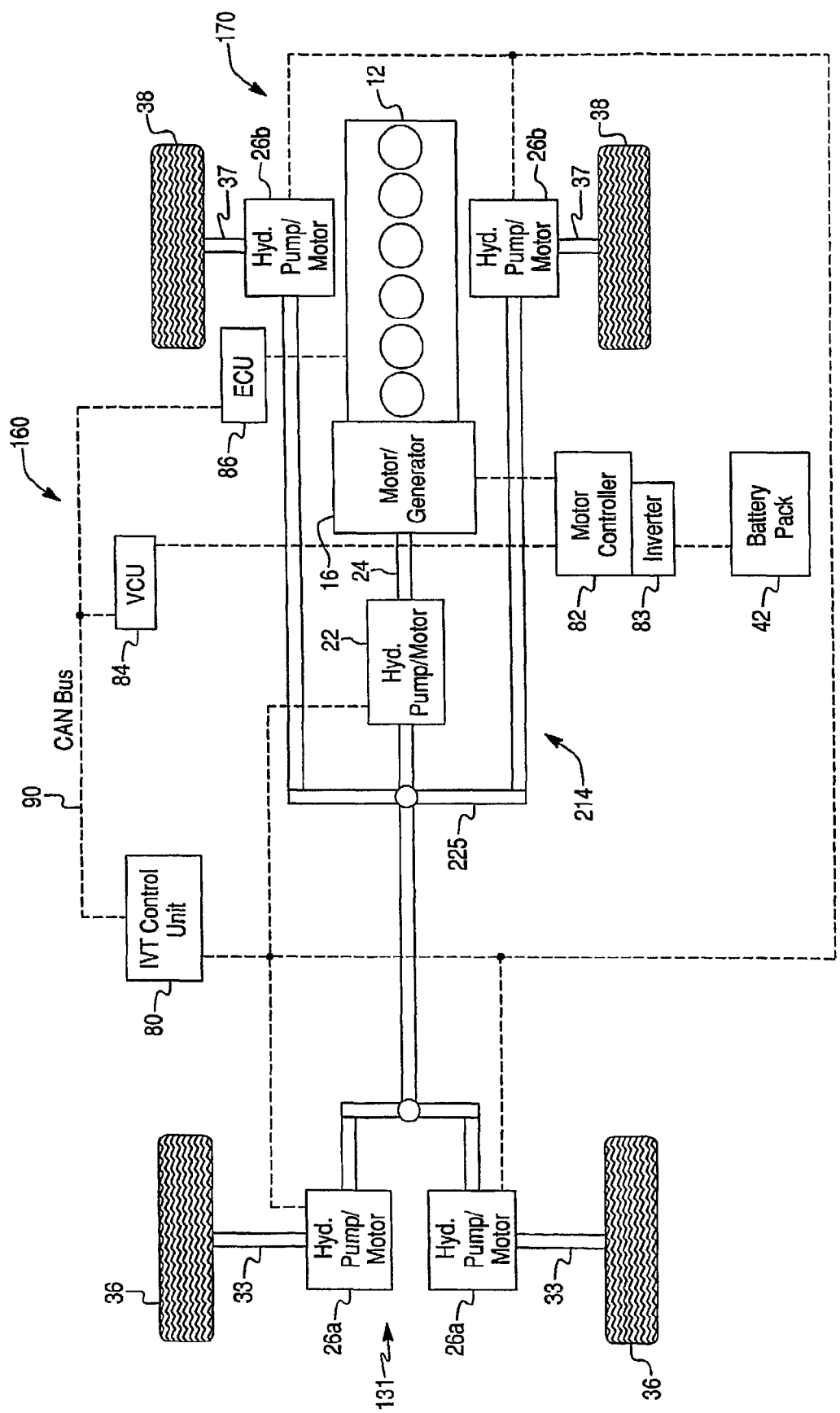
FIG. 10 is a schematic view of a hybrid drive systems in accordance with a fifth exemplary embodiment of the present invention.

FIG. 10 of the drawings illustrates a fifth exemplary embodiment of a hydroelectric hybrid drive system for motor vehicles, generally depicted with the reference numeral 160. Components, which are unchanged from, or function in the same way as in the first through fourth exemplary embodiments of the present invention depicted in FIGS. 1-9 are labeled with the same reference numerals, sometimes without describing detail since similarities between the corresponding parts in the embodiments will be readily perceived by the reader.

FIG. 10 schematically depicts the hydro-electric hybrid drive system 160 for application in an all-wheel-drive (AWD) motor vehicle. The hybrid drive system 160 comprises an internal combustion engine 12 as a prime mover, a hydraulic transmission 214, and an electric motor/generator 16 interposed between the IC engine 12 and the hydraulic transmission 214.

The hydraulic transmission 214 according to the fifth exemplary embodiment of the present invention is an infinitely variable hydrostatic transmission (IVT) including a first hydraulic machine 22 having an input shaft 24, and two pairs of second hydraulic machines 26a and 26b. The first hydraulic machine 22 and the second hydraulic machines 26a and 26b are hydraulically connected to each other through a communication line 225.

Each pair of the second hydraulic machines is associated with one of two drive axle assemblies of the motor vehicle. More specifically, one pair of the second hydraulic machines 26a is associated with a rear drive axle assembly 31 and is provided for driving rear drive wheels 36, while the other pair of the second hydraulic machines 26b is associated with a front drive axle assembly 70 and is provided for driving front drive wheels 38. In other words, the second hydraulic machines 26a are associated with the rear drive axle assembly 131 and are provided for driving the rear drive wheels 36 trough axle shafts 33, and the second hydraulic machines 26b are associated with the front drive axle assembly 170 and are provided for driving the front drive wheels 38 trough axle shafts 37.

As further illustrated in FIG. 10, the electric motor/generator 16 is permanently coupled both to the IC engine 12 and the first hydraulic machine 22 of the hydraulic transmission 214.

Figure 11:
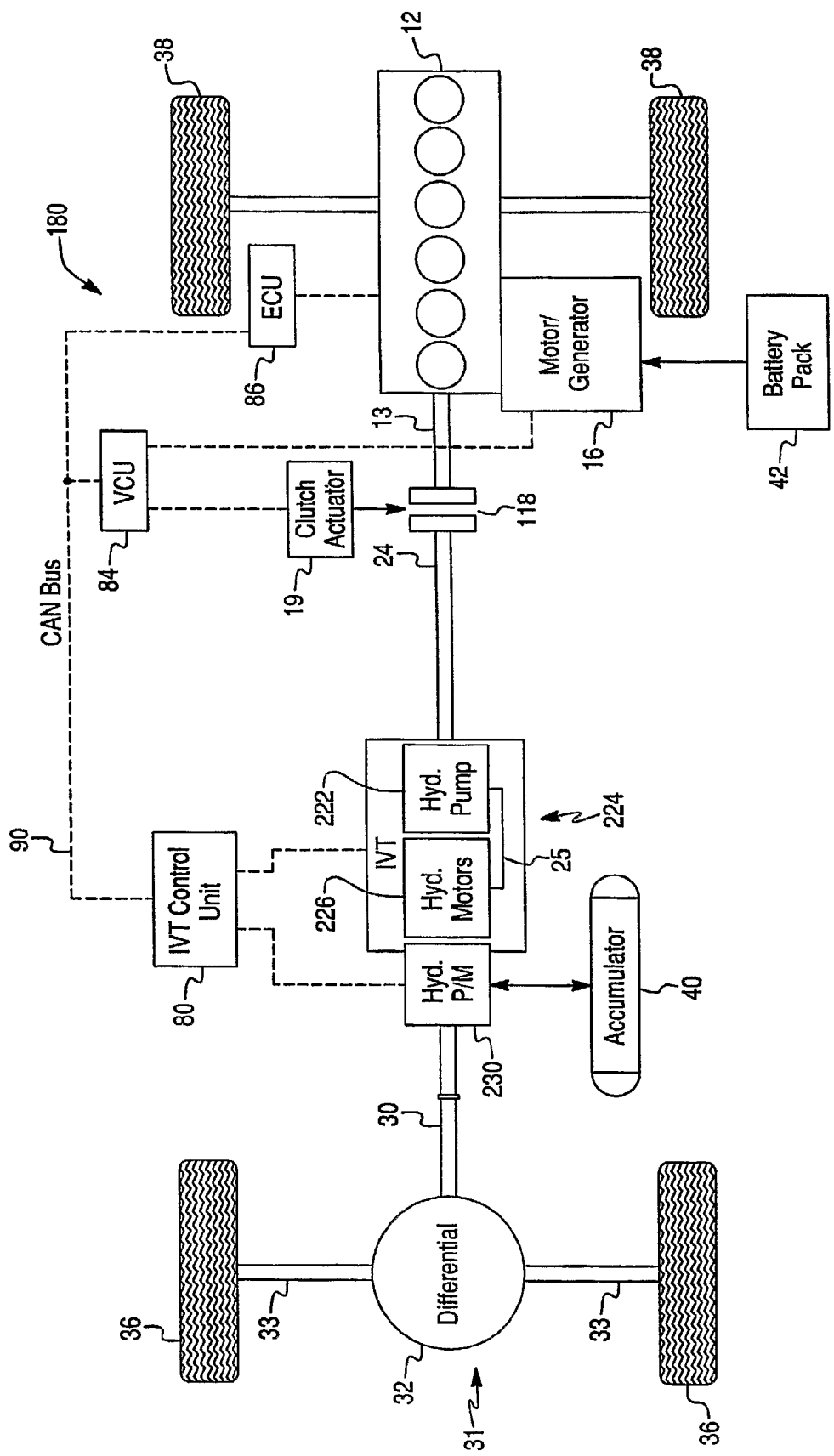
FIG. 11 is a schematic view of a hybrid drive systems in accordance with a sixth exemplary embodiment of the present invention.

FIG. 11 of the drawings illustrates a sixth exemplary embodiment of a hydro-electric hybrid drive system for motor vehicles, generally depicted with the reference numeral 180. Components, which are unchanged from, or function in the same way as in the first through fifth exemplary embodiments of the present invention depicted in FIGS. 1-10 are labeled with the same reference numerals, sometimes without describing detail since similarities between the corresponding parts in the above embodiments will be readily perceived by the reader. Thus, only the portions of the hybrid drive system, which differ, will therefore be explained in detail below.

FIG. 11 schematically depicts the hydroelectric hybrid drive system 180 for application in a rear-wheel-drive (RWD) motor vehicle. The hybrid drive system 180 comprises an internal combustion engine 12 as a prime mover, a hydraulic transmission 224, and an electric motor/generator 16 permanently drivingly coupled the IC engine 12 and the hydraulic transmission 224.

The hydraulic transmission 224 according to the sixth exemplary embodiment of the present invention is an infinitely variable hydrostatic transmission (IVT) including a first hydraulic machine 222 having an input shaft 24, and a second hydraulic machine 226 transmitting torque to rear drive wheels 36 of a rear axle assembly 31 through a rear drive shaft 30. The first hydraulic machine 222 and the second hydraulic machine 226 are hydraulically connected to each other through a communication line 25. Preferably, the first hydraulic machine 222 is a reversible hydraulic pump unit, while the second hydraulic machine 226 is a reversible hydraulic motor unit. Alternatively, both the first and second hydraulic machines 222 and 226 may be in the form of a reversible hydraulic pump/motor unit. Further preferably, each of the first and second hydraulic machines 222 and 226, respectively, is in the form of a digital-displacement (DD) pump/motor unit.

The hybrid drive system 180 in accordance with the sixth exemplary embodiment of the present invention further comprises a third hydraulic machine 230 drivingly coupled to the rear drive shaft 30 and provided specifically for charging a high-pressure hydraulic accumulator 40 when the hybrid drive system 180 is operated in a retarding (recharging) mode. Preferably, the dedicated third hydraulic machine 230 is in the form of a digital-displacement (DD) pump/motor unit.

As further illustrated in FIG. 11, the electric motor/generator 16 is permanently coupled to the IC engine 12, while the IC engine 12 is selectively and operatively coupled to the input shaft 24 of the first hydraulic machine 222 of the hydraulic transmission 224 through a clutch 118 operated by a clutch actuator 19. By contrast to the previous exemplary embodiments of the present invention, the electric motor/generator 16 and the IVT 224 are drivingly coupled to the IC engine 12 in parallel arrangement. Moreover, the electric motor/generator 16 is mounted on a side of the IC engine 12.

Figure 12:
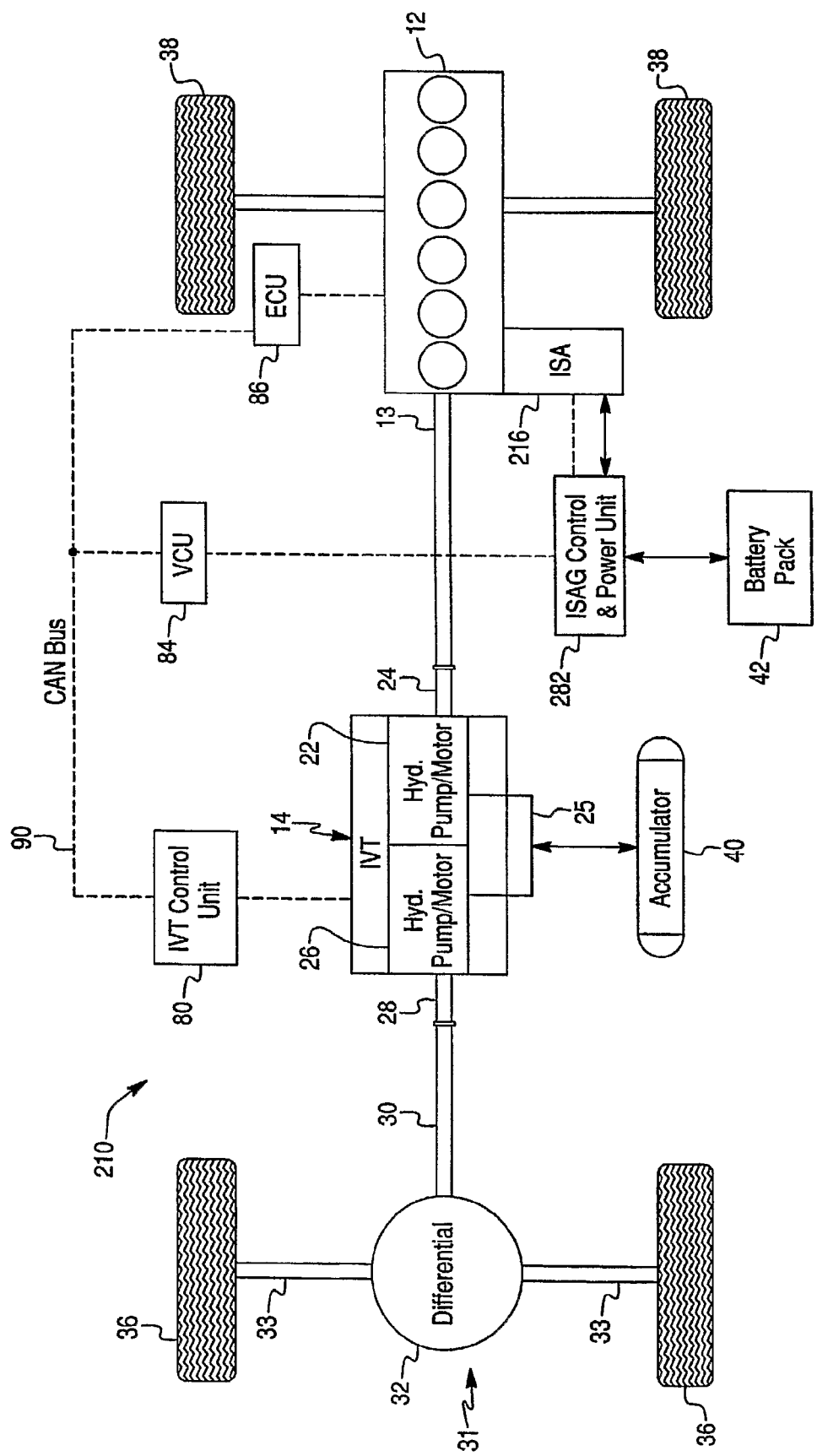
FIG. 12 is a schematic view of a hybrid drive systems in accordance with a seventh exemplary embodiment of the present invention.

FIG. 12 of the drawings illustrates a seventh exemplary embodiment of a hydroelectric hybrid drive system for motor vehicles, generally depicted with the reference numeral 210. Components, which are unchanged from, or function in the same way as in the previous exemplary embodiments of the present invention depicted in FIGS. 1-11 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 12 schematically depicts the hydroelectric hybrid drive system 210 for application in a motor vehicle. The hybrid drive system 210 comprises an internal combustion engine 12 as a prime mover, a hydraulic transmission 14, and an electric motor/generator 216 in the form of an integrated starter/alternator unit (ISA).

The hydraulic transmission 14 is an infinitely variable hydrostatic transmission (IVT) including a first hydraulic machine 22 having an input shaft 24, and a second hydraulic machine 26 having an output shaft 28 transmitting torque from the second hydraulic machine 26 to rear drive wheels 36 of a rear axle assembly 31 through a rear drive shaft 30.

The ISA unit 216 is mounted on a side of the IC engine 12 and is permanently coupled to the IC engine 12. In turn, the crankshaft 13 of the IC engine 12 is permanently coupled to the input shaft 24 of the first hydraulic machine 22 of the IVT 14. In other words, the ISA unit 216 and the IVT 14 are drivingly coupled to the IC engine 12 in parallel arrangement.

Figure 13:
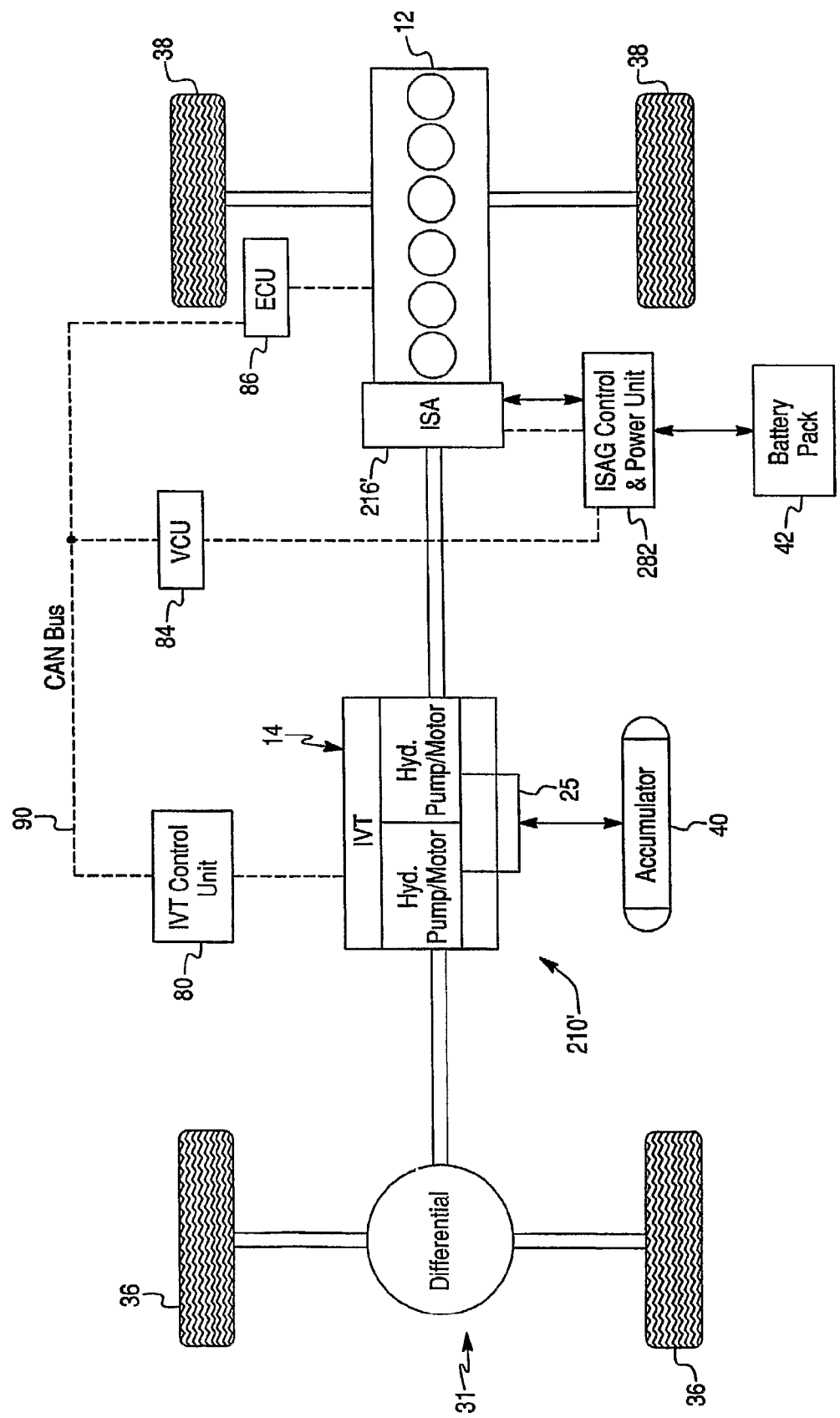
FIG. 13 is a schematic view of an alternative arrangement of the hybrid drive system according to the seventh exemplary embodiment of the present invention.

In an alternative arrangement of the hybrid drive system according to the seventh exemplary embodiment of the present invention, illustrated in FIG. 13 and generally depicted by the reference numeral 210', the ISA unit 216 is interposed between the IC engine 12 and the hydraulic transmission 14. In other words, the hydraulic transmission 14 and the electric motor/generator 16 are connected to the internal combustion engine 12 in series.

Moreover, the ISA unit 216 is controlled by an ISA electronic control unit 282 in turn connected to the control units 80, 84 and 86 of the hybrid drive system 210 through the CAN bus 90 of the motor vehicle.

Figure 14:
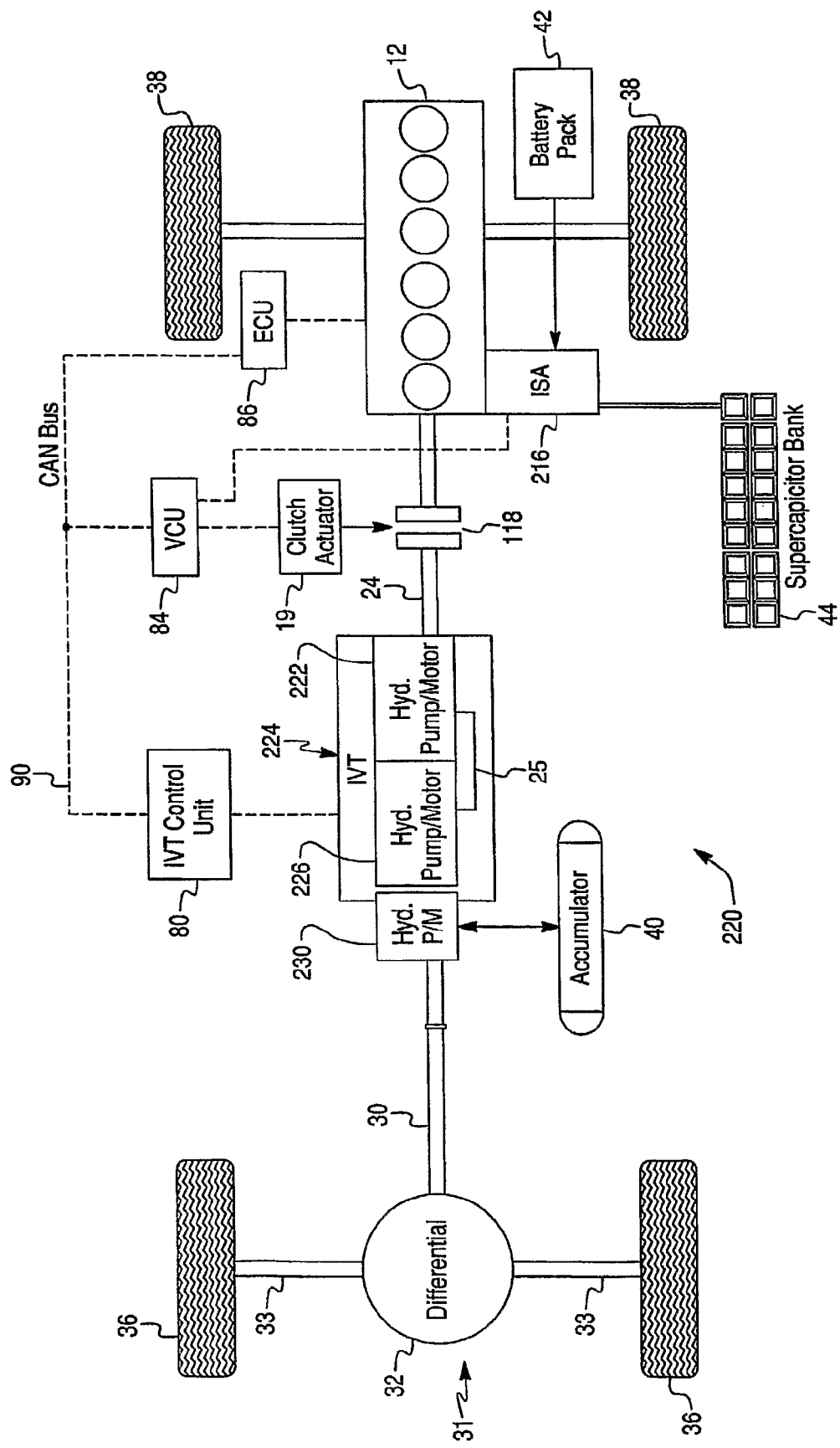
FIG. 14 is a schematic view of a hybrid drive systems in accordance with an eighth exemplary embodiment of the present invention.

FIG. 14 of the drawings illustrates an eighth exemplary embodiment of a hydroelectric hybrid drive system for motor vehicles, generally depicted with the reference numeral 220. Components, which are unchanged from, or function in the same way as in the previous exemplary embodiments of the present invention depicted in FIGS. 1-13 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 14 schematically depicts the hydroelectric hybrid drive system 220 for application in a motor vehicle. The hybrid drive system 220 comprises an internal combustion engine 12 as a prime mover, a hydraulic transmission 224, and an electric motor/generator 216 in the form of an integrated starter/alternator unit (ISA).

The hydraulic transmission 224 is an infinitely variable hydrostatic transmission (IVT) including a first hydraulic machine 222 having an input shaft 24, and a second hydraulic machine 226 transmitting torque to rear drive wheels 36 of a rear axle assembly 31 through a rear drive shaft 30. The first hydraulic machine 222 and the second hydraulic machine 226 are hydraulically connected to each other through a communication line 25. Preferably, the first hydraulic machine 222 is a reversible hydraulic pump unit, while the second hydraulic machine 226 is a reversible hydraulic motor unit. Alternatively, both the first and second hydraulic machines 222 and 226 may be in the form of a reversible hydraulic pump/motor unit. Further preferably, each of the first and second hydraulic machines 222 and 226, respectively, is in the form of a digital-displacement (DD) pump/motor unit.

The hybrid drive system 220 further comprises a third hydraulic machine 230 drivingly coupled to the rear drive shaft 30 and provided specifically for charging a high-pressure hydraulic accumulator 40 when the hybrid drive system 180 is operated in a retarding (recharging) mode. Preferably, the dedicated third hydraulic machine 230 is in the form of a digital-displacement (DD) pump/motor unit.

The ISA unit 216 is mounted on a side of the IC engine 12 and is permanently coupled to the IC engine 12. In turn, the crankshaft 13 of the IC engine 12 is permanently coupled to the input shaft 24 of the first hydraulic machine 22 of the IVT 14. In other words, the ISA unit 216 and the IVT 14 are drivingly coupled to the IC engine 12 in parallel arrangement.

Figure 15:
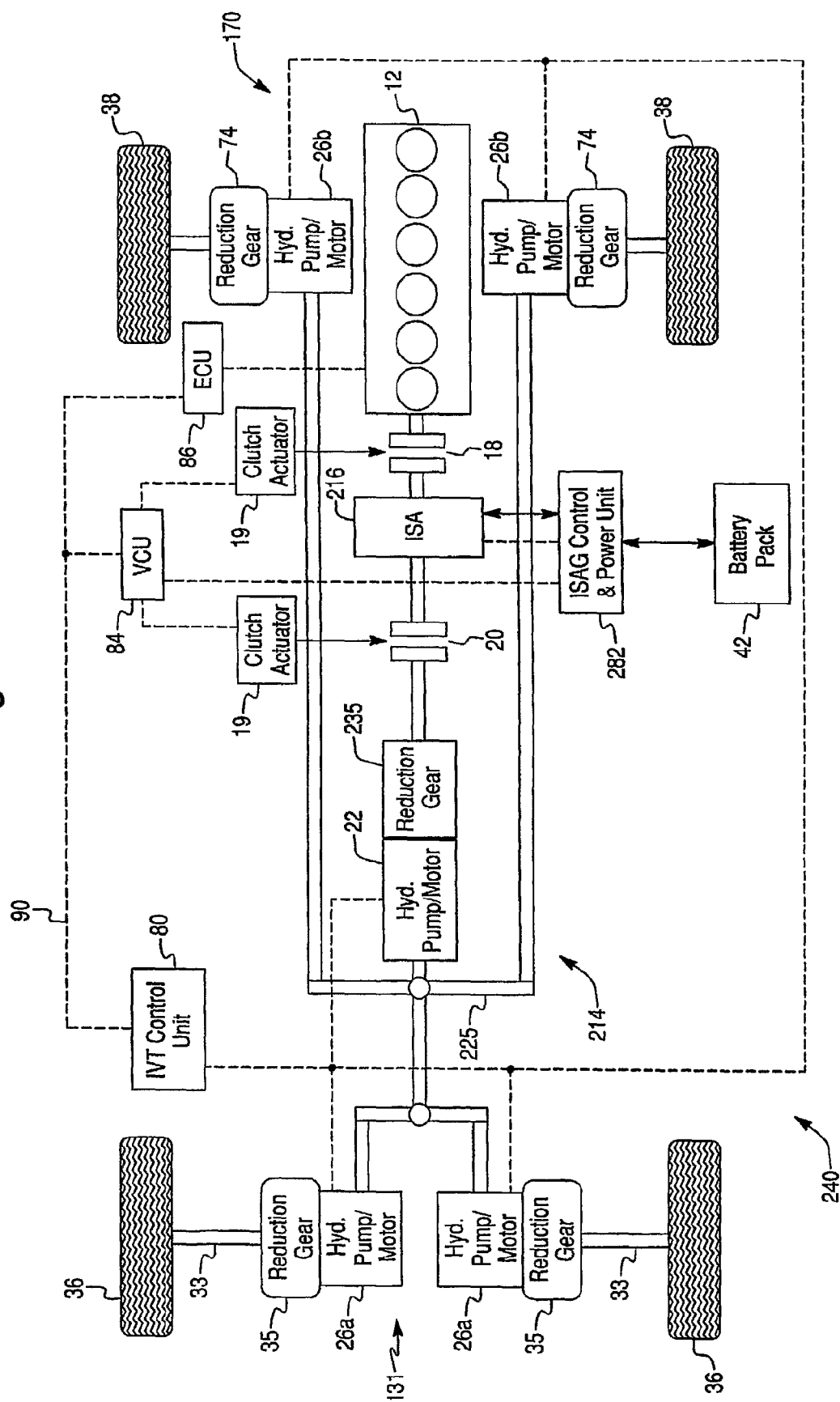
FIG. 15 is a schematic view of a hybrid drive systems in accordance with a ninth exemplary embodiment of the present invention.

FIG. 15 of the drawings illustrates a ninth exemplary embodiment of a hydro-electric hybrid drive system for motor vehicles, generally depicted with the reference numeral 240. Components, which are unchanged from, or function in the same way as in the previous exemplary embodiments of the present invention depicted in FIGS. 1-14 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 15 schematically depicts the hydro-electric hybrid drive system 240 for application in a motor vehicle. The hybrid drive system 240 comprises an internal combustion engine 12 as a prime mover, a hydraulic transmission 214, and an electric motor/generator 216 in the form of an integrated starter/alternator unit (ISA).

The hydraulic transmission 214 is an infinitely variable hydrostatic transmission (IVT) including a first hydraulic machine 22 having an input shaft 24, and two pairs of second hydraulic machines 26a and 26b. The first hydraulic machine 22 and the second hydraulic machines 26a and 26b are hydraulically connected to each other through a communication line 225.

Each pair of the second hydraulic machines is associated with one of two drive axle assemblies of the motor vehicle. More specifically, one pair of the second hydraulic machines 26a is associated with a rear drive axle assembly 31 and is provided for driving rear drive wheels 36, while the other pair of the second hydraulic machines 26b is associated with a front drive axle assembly 70 and is provided for driving front drive wheels 38. In other words, the second hydraulic machines 26a are associated with the rear drive axle assembly 131 and are provided for driving the rear drive wheels 36 trough axle shafts 33, and the second hydraulic machines 26b are associated with the front drive axle assembly 170 and are provided for driving the front drive wheels 38 trough axle shafts 37.

As further illustrated in FIG. 15, the electric motor/generator 16 is selectively coupled to the IC engine 12 through the clutch 18 and to the first hydraulic machine 22 of the hydraulic transmission 214 through the clutch 20. The hybrid drive system 240 further comprises a reduction gear mechanism 235 interposed between the IVT 214 and the electric motor/generator 16. Preferably, the reduction gear mechanism 235 is coupled to the first hydraulic machine 22 and is selectively coupled to the electric motor/generator 16 through the clutch 20.

Figure 16:
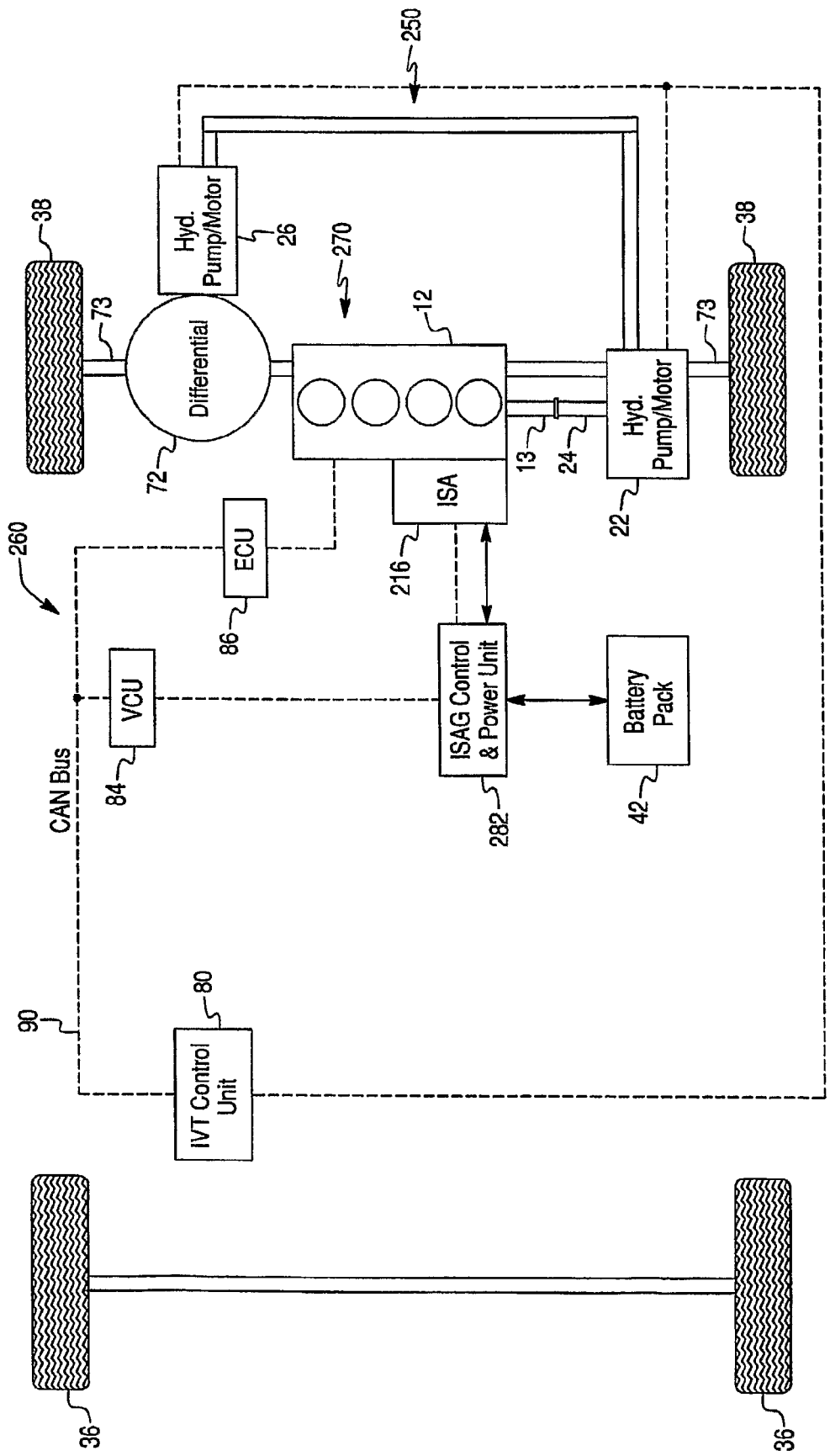
FIG. 16 is a schematic view of a hybrid drive systems in accordance with a tenth exemplary embodiment of the present invention.

FIG. 16 of the drawings illustrates a tenth exemplary embodiment of a hydroelectric hybrid drive system for motor vehicles, generally depicted with the reference numeral 260. Components, which are unchanged from, or function in the same way as in the previous exemplary embodiments of the present invention depicted in FIGS. 1-15 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 16 schematically depicts the hydro-electric hybrid drive system 260 for application in a front-wheel-drive (FWD) motor vehicle. The hybrid drive system 260 comprises an internal combustion engine 12 as a prime mover, a hydraulic transmission 250, and an electric motor/generator 216 in the form of an integrated starter/alternator unit (ISA). The hydraulic transmission 250 is an infinitely variable hydrostatic transmission (IVT) including a first hydraulic machine 22 having an input shaft 24, and a second hydraulic machine 26 having an output shaft transmitting torque from the second hydraulic machine 26 to front drive wheels 38 of a front axle assembly 270 through a front differential 72 and front axle shafts 73. The ISA unit 216 is mounted on a side of the IC engine 12 and is permanently coupled to the IC engine 12. In turn, the crankshaft 13 of the IC engine 12 is permanently coupled to the input shaft 24 of the first hydraulic machine 22 of the IVT 250. In other words, the ISA unit 216 and the IVT 250 are drivingly coupled to the IC engine 12 in parallel arrangement.

Moreover, by contrast to the previous exemplary embodiments of the present invention, the hybrid drive system 260 in accordance with the ninth exemplary embodiment of the present invention is integrated with an East/West engine layout.

Combining the digital displacement infinitely variable transmission (DD IVT) (14, 224 or 250) having wide ratio span with the integrated starter/alternator (ISA) 216 significantly improves fuel economy, and combining it with an accumulated energy from regenerative braking can be used to launch the vehicle and get greater improvements in fuel economy and emissions. With the hybrid drive system of the present invention using the integrated starter/alternator, the stored hydraulic energy from the hydraulic accumulator can be used to apply a load to the hydraulic digital displacement pump/motor unit that is operatively coupled to the engine and spins the engine up to firing speed. This allows for the engine to be turned off at a stop or vehicle idle condition which increases fuel economy and does not allow harmful emissions to be emitted by the vehicle because the engine is turned off. The ISA unit 216 can also be used to spin the engine 12 up to firing speed, supply voltage to electrical auxiliary applications (power tools, lighting, powering electronic systems, computers, etc.) while the vehicle is stopped and the DD IVT is de-clutched from the internal combustion engine 12 and the ISA unit 216, or may be used when the engine 12 and the DD IVT are coupled and the vehicle is moving. By adding a large enough battery pack 42 (or capacitors 44), the ISA unit 216 can charge the battery pack 42 or capacitors 44 and use the stored electric energy to propel the vehicle for a limited amount of time and distance. All this is possible with the DD IVT because the drive wheels (36 or 38 or both) are not mechanically coupled to the engine 12 through a differential, a drive shaft and a conventional mechanical transmission. The second pump/motor unit 26 that supplies torque and speed through mechanical means to the wheels is hydraulically coupled with the first pump/motor unit (or pump) 22, in turn connected to the engine 12 (directly or through a set of shafts and clutches).

The DD IVT, the ISA unit 216 and the engine 12 are coupled mechanically such that the three components can operate in a manner where the engine can power independently or in combination the DD IVT to propel the vehicle forward or reverse and/or charge the hydraulic accumulator 40, and the ISA unit 216 to propel the vehicle in forward or reverse through the DD IVT and charge the battery pack 42 or a set of capacitors 44. Also, the ISA unit 216 can be used to operate the DD IVT independently. The DD IVT with the use of the stored energy can spin the engine 12 up to firing speed and during the same time as the engine 12 is spinning, the DD IVT can supply torque and speed to the drive wheels through hydro-mechanical means to propel the vehicle in a forward or reverse direction. The ISA unit 216 with the use of stored energy in the battery pack 42 or the capacitors or the super-capacitor bank 44 can spin the engine 12 up to firing speed and at the same time supply torque and speed to the first hydraulic machine (22 or 222) of the DD IVT so the pump can provide flow and pressure to the second hydraulic machine (26 or 226) of the IVT to propel the vehicle in a forward or reverse direction. This technology can be configured for front wheel drive, rear wheel drive, all wheel drive and four wheel drive vehicles. Also, the hybrid drive system in accordance with the present invention can be integrated with North/South and East/West engine layouts.

Figure 17:
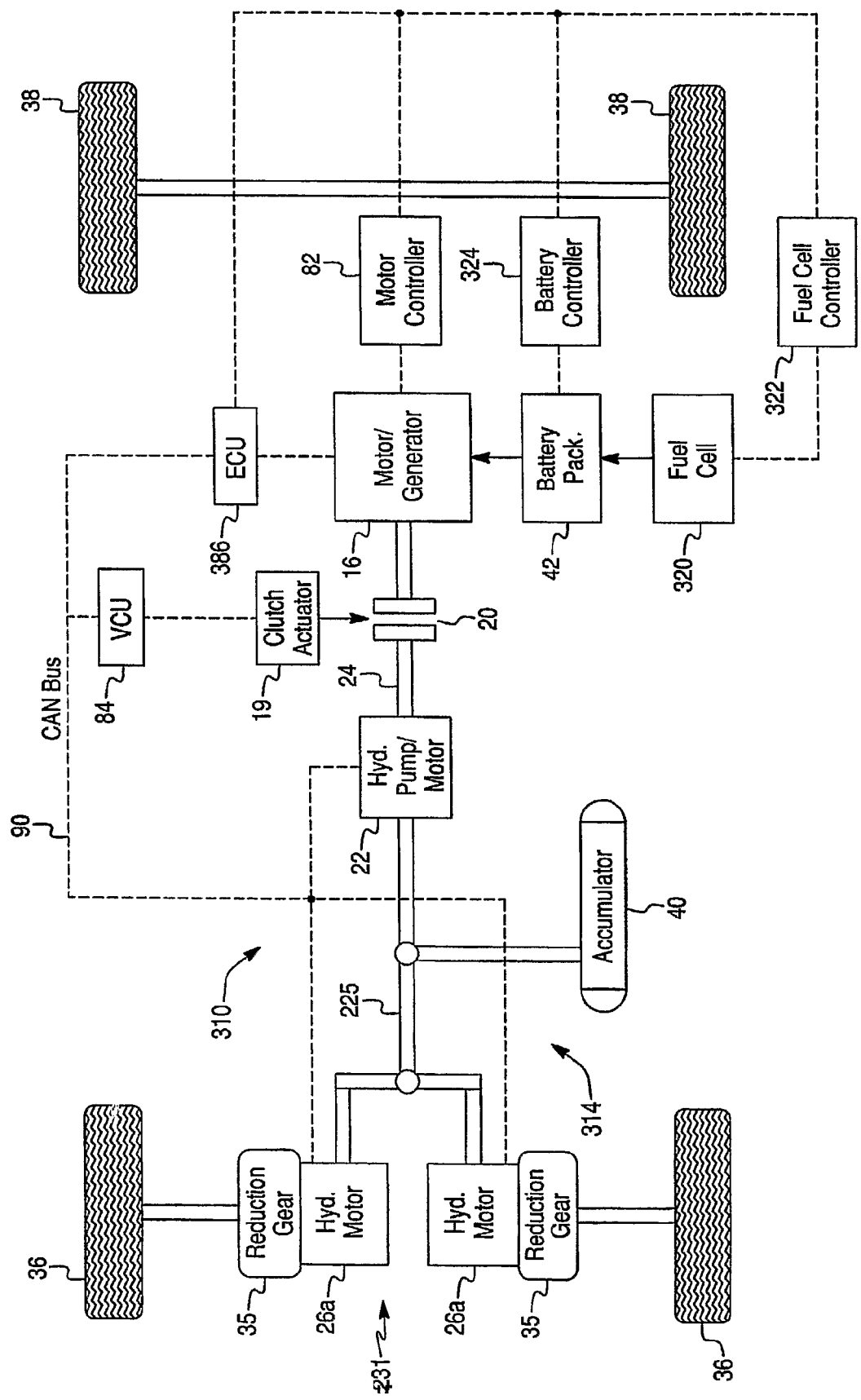
FIG. 17 is a schematic view of a hybrid drive systems in accordance with an eleventh exemplary embodiment of the present invention.

FIG. 17 of the drawings illustrates an eleventh exemplary embodiment of a hydro-electric hybrid drive system for motor vehicles, generally depicted with the reference numeral 310. Components, which are unchanged from, or function in the same way as in the previous exemplary embodiments of the present invention depicted in FIGS. 1-16 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 17 schematically depicts the hydroelectric hybrid drive system 310 in accordance with the eleventh exemplary embodiment of the present invention for application in a rear-wheel-drive (RWD) motor vehicle. The hybrid drive system 310 comprises an electric motor/generator 16 as a prime mover and a hydraulic transmission 314 selectively and operatively coupled to the electric motor/generator 16 through a clutch 20.

Moreover, the hybrid drive system 310 further includes at least one electric energy storage device 42 and a fuel cell stack 320 that generates electrical energy and produces a continuously available electric current. Preferably, the electric energy storage device 42 is in the form of an electric storage battery pack 42 electrically connected to the electric motor/generator 16. Alternatively, the electric energy storage device may be in the form of a bank of super-capacitors or any other appropriate chargeable device for storing electric current. The electric energy storage device 42 can be used to store braking energy of the motor vehicle and the stored energy can be reused to start the engine and/or drive the vehicle by the electric motor/generator 16. Furthermore, the fuel cell stack 320 is electrically connected to the electric storage battery pack 42 for charging thereof.

The hydraulic transmission 314 is an infinitely variable hydrostatic transmission (IVT) including a first hydraulic machine 22 having an input shaft 24, and a pair of second hydraulic machines 26a and 26b. The first hydraulic machine 22 and the second hydraulic machines 26a and 26b are hydraulically connected to each other through a communication line 225. Further preferably, each of the first and second hydraulic machines 22 and 26, respectively, is in the form of a digital-displacement (DD) pump/motor unit.

The pair of the second hydraulic machines 26a and 26b is associated with a rear drive axle assembly 231 and is provided for driving rear drive wheels 36. More specifically, each of the pair of the second hydraulic machines 26a and 26b is drivingly coupled with the corresponding rear drive wheels 36, as shown in FIG. 17.

As further illustrated in FIG. 17, the DD IVT 314 is controlled by an electronic control unit 386, the electric motor/generator 16 is controlled by an electronic motor controller 82, the fuel cell stack 320 is controlled by a fuel cell controller 322, and the electric battery pack 42 is controlled by a battery controller 324. More specifically, the TCU 80 controls poppet valves of the first and second digital-displacement pump/motor units 22 and 26, respectively. The clutched 20 is operated by a clutch actuator 19, which, in turn, is controlled by an electronic vehicle control unit (VCU) 84. The clutch actuator 19 may of any appropriate type known in the art, such as hydraulic, electromagnetic or solenoid, electro-hydraulic, etc. All of the control units 82, 84, 322, 324 and 386 of the hybrid drive system 310 are integrated and connected to the controller area network (CAN) bus 90 of the motor vehicle.

Figure 18:
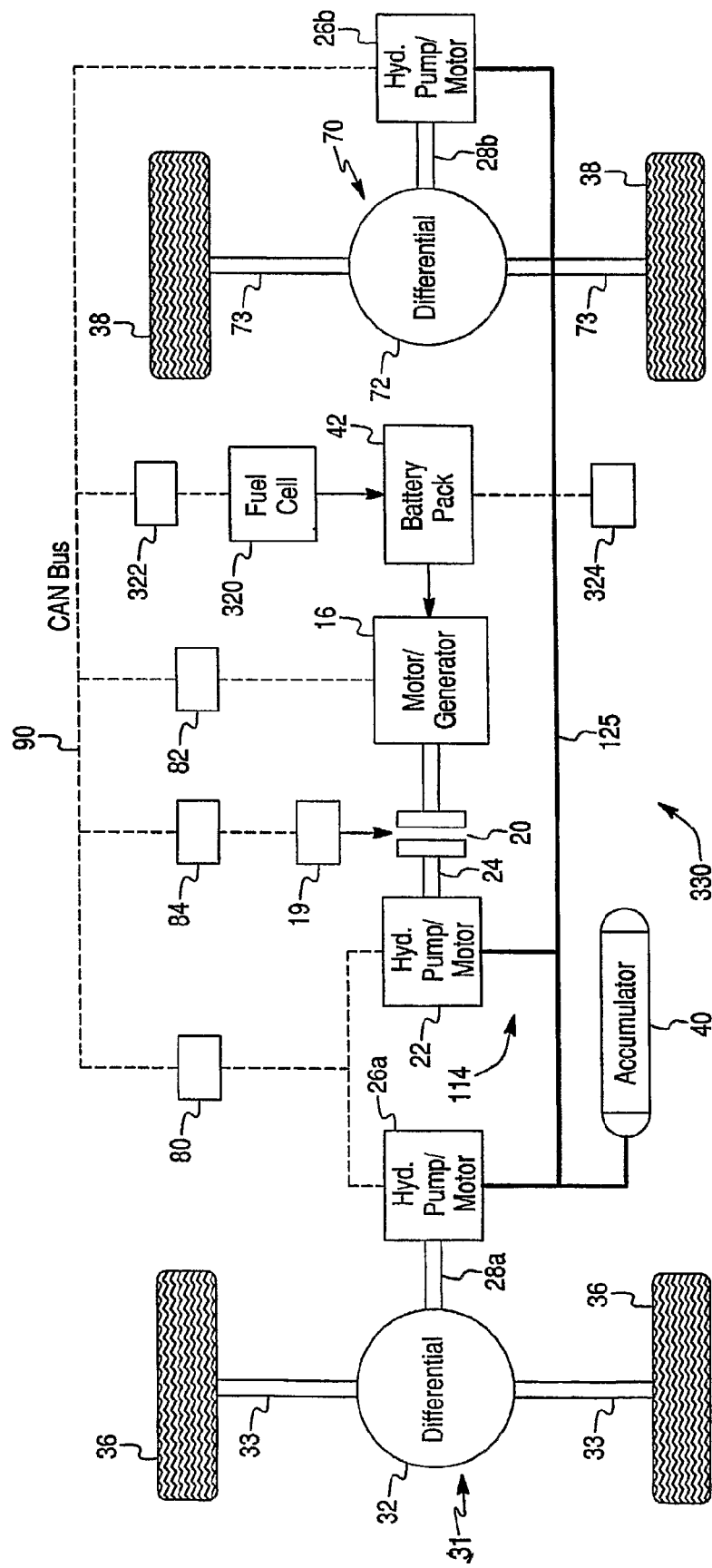
FIG. 18 is a schematic view of a hybrid drive systems in accordance with a twelfth exemplary embodiment of the present invention.

FIG. 18 of the drawings illustrates a twelfth exemplary embodiment of a hydro-electric hybrid drive system for motor vehicles, generally depicted with the reference numeral 330. Components, which are unchanged from, or function in the same way as in the previous exemplary embodiments of the present invention depicted in FIGS. 1-16 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 18 schematically depicts the hydro-electric hybrid drive system 330 for application in an all-wheel-drive (AWD) motor vehicle. The hybrid drive system 330 comprises an electric motor/generator 16 as a prime mover and a hydraulic transmission 114 selectively and operatively coupled to the electric motor/generator 16 through a clutch 20.

The hydraulic transmission 114 according to the third exemplary embodiment of the present invention is an infinitely variable hydrostatic transmission (IVT) including a first hydraulic machine 22 having an input shaft 24, and a two second hydraulic machines 26a and 26b each having an output shaft (28a and 28b, respectively). The first hydraulic machine 22 and the second hydraulic machines 26a and 26b are hydraulically connected to each other through a communication line 125. More specifically, one of the second hydraulic machines 26a is associated with a rear drive axle assembly 31 and is provided for driving rear drive wheels 36, while the other of the second hydraulic machines 26b is associated with a front drive axle assembly 70 and is provided for driving front drive wheels 38.

Moreover, the hybrid drive system 330 further includes at least one electric energy storage device 42 and a fuel cell stack 320 that generates electrical energy and produces a continuously available electric current. Preferably, the electric energy storage device 42 is in the form of an electric storage battery pack 42 electrically connected to the electric motor/generator 16. Alternatively, the electric energy storage device may be in the form of a bank of super-capacitors or any other appropriate chargeable device for storing electric current. The electric energy storage device 42 can be used to store braking energy of the motor vehicle and the stored energy can be reused to start the engine and/or drive the vehicle by the electric motor/generator 16. Furthermore, the fuel cell stack 320 is electrically connected to the electric storage battery pack 42 for charging thereof.

Figure 19:
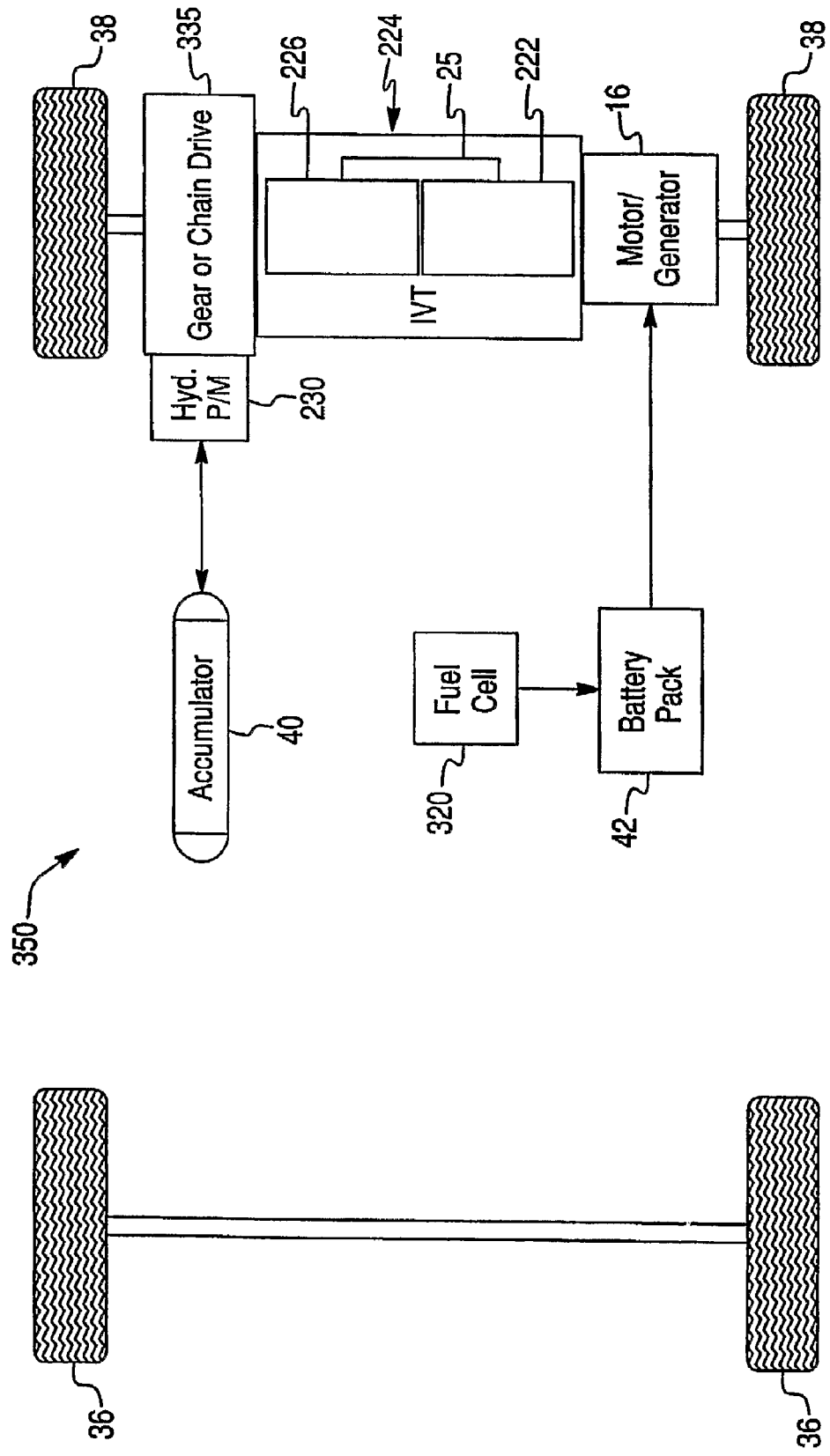
FIG. 19 is a schematic view of a hybrid drive systems in accordance with a thirteenth exemplary embodiment of the present invention.

FIG. 19 of the drawings illustrates a thirteenth exemplary embodiment of a hydro-electric hybrid drive system for motor vehicles, generally depicted with the reference numeral 350. Components, which are unchanged from, or function in the same way as in the previous exemplary embodiments of the present invention depicted in FIGS. 1-17 are labeled with the same reference numerals, sometimes without describing detail since similarities between the corresponding parts in the previous embodiments will be readily perceived by the reader. Thus, only the portions of the hybrid drive system, which differ, will therefore be explained in detail below.

FIG. 19 schematically depicts the hydroelectric hybrid drive system 350 for application in a front-wheel-drive (FWD) motor vehicle. The hybrid drive system 350 comprises an electric motor/generator 16 as a prime mover and a hydraulic transmission 224 operatively coupled to the electric motor/generator 16.

The hydraulic transmission 224 is an infinitely variable hydrostatic transmission (IVT) including a first hydraulic machine 222 and a second hydraulic machine 226 transmitting torque to front drive wheels 38. The first hydraulic machine 222 and the second hydraulic machine 226 are hydraulically connected to each other through a communication line 25. Preferably, the first hydraulic machine 222 is a reversible hydraulic pump unit, while the second hydraulic machine 226 is a reversible hydraulic motor unit. Alternatively, both the first and second hydraulic machines 222 and 226 may be in the form of a reversible hydraulic pump/motor unit. Further preferably, each of the first and second hydraulic machines 222 and 226, respectively, is in the form of a digital-displacement (DD) pump/motor unit.

The hybrid drive system 350 further comprises a third hydraulic machine 230 drivingly coupled to the second hydraulic machine 226 through a gear or chain drive 335 and provided specifically for charging a high-pressure hydraulic accumulator 40 when the hybrid drive system 350 is operated in a retarding (recharging) mode. Preferably, the dedicated third hydraulic machine 230 is in the form of a digital-displacement (DD) pump/motor unit.

Moreover, the hybrid drive system 350 further includes at least one electric energy storage device 42 and a fuel cell stack 320 that generates electrical energy and produces a continuously available electric current. Preferably, the electric energy storage device 42 is in the form of an electric storage battery pack 42 electrically connected to the electric motor/generator 16. Alternatively, the electric energy storage device may be in the form of a bank of super-capacitors or any other appropriate chargeable device for storing electric current. The electric energy storage device 42 can be used to store braking energy of the motor vehicle and the stored energy can be reused to start the engine and/or drive the vehicle by the electric motor/generator 16. Furthermore, the fuel cell stack 320 is electrically connected to the electric storage battery pack 42 for charging thereof.

The hybrid hydroelectric regenerative drive system of the present invention is operable in three modes of operation including a retarding mode, a driving mode and a neutral mode.

In the retarding mode, as an external source of the kinetic energy drives the hydraulic pump/motor unit which functions as a hydraulic pump and/or the electric motor/generator which functions as an electric generator. Consequently, the pump/motor unit generates a pressurized hydraulic fluid supplied to the storage hydraulic accumulators, while the electric motor/generator generates the electric current supplied to the electric storage device(s). The load required driving the hydraulic pump and the electric generator creates a retardation force on the drive wheels of the motor vehicle.

In the driving mode, the pressurized hydraulic fluid is released from the energy storage hydraulic accumulators to drive the pump/motor unit and/or the electric current from the electric storage device(s) drives the electric motor/generator. In this mode, the pump/motor unit acts as a hydraulic motor, while the electric motor/generator acts as an electric motor to generate torque rotating the drive wheels of the motor vehicle, thus assisting propulsion of the vehicle using hydraulic energy of the pressurized hydraulic fluid from the hydraulic accumulators or the electric energy from the electric storage device(s).

In the neutral mode, the hydraulic pump/motor unit and/or the electric motor/generator are rendered substantially inoperative to exert any significant driving or retarding influence on the drive wheels of the motor vehicle.

Therefore, the hybrid hydroelectric drive system of the present invention is adapted to supply the supplementary regenerative power and retardation to the drive wheels substantially independently of the prime mover.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hybrid electro-hydraulic drive system for a motor vehicle having at least one pair of drive wheels, said drive system comprising:

a hydraulic transmission including a first hydraulic machine and at least one second hydraulic machine drivingly mechanically connected to at least one of said drive wheels of said motor vehicle for driving thereof;

said first hydraulic machine hydraulically connected to said at least one second hydraulic machine for selectively supplying hydraulic fluid under pressure to said at least one second hydraulic machine so as to hydraulically drive said at least one second hydraulic machine;

said at least one second hydraulic machine being a reversible hydraulic pump/motor unit capable to function both as a hydraulic pump and a hydraulic motor;

an electric motor/generator operatively mechanically connected to said first hydraulic machine; and at least one energy storage device operable to store and release one of a hydraulic fluid energy and an electrical energy;

said at least one energy storage device operatively connected to one of said hydraulic transmission and said electric motor/generator.

2. The hybrid electro-hydraulic drive system as defined in claim 1, further comprising an internal combustion engine operatively mechanically coupled to said electric motor/generator.

3. The hybrid electro-hydraulic drive system as defined in claim 1, wherein said first hydraulic machine is a digital displacement hydraulic machine including actively controlled poppet valves which rectify the hydraulic fluid flow into and out of said hydraulic machine, wherein at least some of said valves are operated by an electro-magnetic actuator so that they can be opened and closed on a stroke-by-stroke basis, and wherein said electro-magnetic actuator of said valves is activated by an electronic control unit.

4. The hybrid electro-hydraulic drive system as defined in claim 2, wherein said electric motor/generator is interposed between said internal combustion engine and said first hydraulic machine so that said electric motor/generator and said first hydraulic machine are coupled to said internal combustion engine in parallel.

5. The hybrid electro-hydraulic drive system as defined in claim 2, wherein said electric motor/generator and said first hydraulic machine are coupled to said internal combustion engine in series.

6. The hybrid hydraulic drive system as defined in claim 2, further including a clutch provided for selectively coupling said electric motor/generator to said internal combustion engine.

7. The hybrid hydraulic drive system as defined in claim 2, wherein said electric motor/generator is an integrated starter/alternator unit drivingly coupled to said internal combustion engine for starting thereof and generating electric current.

8. The hybrid hydraulic drive system as defined in claim 1, wherein said at least one energy storage device is a fluid energy storage accumulator operable to store and release a pressurized fluid, said at least one fluid energy storage accumulator is in fluid communication with said hydraulic transmission.

9. The hybrid hydraulic drive system as defined in claim 8, further including a dedicated third hydraulic machine provided for charging said fluid energy storage accumulator.

10. The hybrid hydraulic drive system as defined in claim 9, wherein said third hydraulic machine is a reversible hydraulic pump/motor unit capable to function both as a hydraulic pump and a hydraulic motor.

11. The hybrid hydraulic drive system as defined in claim 9, wherein said third hydraulic machine is a digital displacement hydraulic machine including actively controlled poppet valves which rectify the hydraulic fluid flow into and out of said hydraulic machine, wherein said valves are each operated by an electro-magnetic actuator so that they can be opened and closed on a stroke-by-stroke basis, and wherein said electro-magnetic actuator of each of said valves is activated by an electronic control unit.

12. The hybrid hydraulic drive system as defined in claim 8, further comprising a reduction gear mechanism interposed between said hydraulic transmission and said electric motor/generator.

13. The hybrid hydraulic drive system as defined in claim 1, wherein said motor vehicle has front and rear drive axle assemblies, and wherein said at least one second hydraulic machine includes two second hydraulic machines each associated with one of said front and rear drive axle assemblies so that one of said second hydraulic machines is drivingly connected to drive wheels of said rear drive axle assembly and the other of said second hydraulic machines is drivingly connected to drive wheels of said front drive axle assembly.

14. The hybrid hydraulic drive system as defined in claim 1, wherein said at least one second hydraulic machine includes two second hydraulic machines each drivingly connected to one of said pair of drive wheels.

15. The hybrid hydraulic drive system as defined in claim 1, wherein said motor vehicle has front and rear drive axle assemblies each having a pair of drive wheels, and wherein said at least one second hydraulic machine includes four second hydraulic machines, each of said four second hydraulic machines is drivingly connected to one of said drive wheels of said front and rear drive axle assemblies.

16. The hybrid hydraulic drive system as defined in claim 1, wherein said motor vehicle has front and rear drive axle assemblies, and wherein an output shaft of said at least one second hydraulic machine of said hydraulic transmission is drivingly connected to a transfer case that apportions a drive torque of said hydraulic transmission between said rear drive axle assembly and said front drive axle assembly.

17. The hybrid hydraulic drive system as defined in claim 1, wherein said at least one energy storage device is an electric energy storage device including at least one of an electric battery and a super capacitor bank operable to store and release said electrical energy, said electric energy storage device is electrically connected to said electric motor/generator.

18. The hybrid hydraulic drive system as defined in claim 17, further including a fuel cell stack for generating said electrical energy, said fuel cell stack is operatively connected to said electric motor/generator.

19. The hybrid hydraulic drive system as defined in claim 18, wherein said fuel cell stack is electrically connected to said electric energy storage device.

20. The hybrid hydraulic drive system as defined in claim 1, further including a clutch provided for selectively coupling said first hydraulic machine to said electric motor/generator.

21. The hybrid hydraulic drive system as defined in claim 1, wherein said electric motor/generator is a DC electric machine.

\* \* \* \* \*